United States Patent [19]

Richardson et al.

[11] Patent Number: 5,963,894
[45] Date of Patent: *Oct. 5, 1999

[54] METHOD AND SYSTEM FOR BOOTSTRAPPING STATISTICAL PROCESSING INTO A RULE-BASED NATURAL LANGUAGE PARSER

[75] Inventors: Stephen Darrow Richardson, Redmond; George E. Heidorn, Bellevue, both of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,959

[22] Filed: May 20, 1997

Related U.S. Application Data

[63] Continuation of application No. 08/265,845, Jun. 24, 1994, Pat. No. 5,752,052.

[51] Int. Cl.$^6$ .............. G06F 17/27; G06F 17/28
[52] U.S. Cl. ............ 704/9; 704/2; 704/4; 704/8; 704/257; 707/532
[58] Field of Search ............... 704/4, 9, 8, 2, 704/10, 257; 705/1; 706/11; 345/326; 707/532

[56] References Cited

U.S. PATENT DOCUMENTS

| 4,829,423 | 5/1989 | Tennant et al. ............ 704/8 |
| 4,887,212 | 12/1989 | Zarnora et al. ............ 704/8 |
| 5,146,406 | 9/1992 | Jensen ............ 704/9 |

(List continued on next page.)

FOREIGN PATENT DOCUMENTS

| 0 582 377 A2 | 2/1994 | European Pat. Off. .......... G10L 5/02 |
| 0582377A2 | 9/1994 | European Pat. Off. .......... G10L 5/02 |
| WO 94/07238 | 3/1994 | WIPO .............. G10L 9/00 |
| WO 95/10108 | 4/1995 | WIPO .............. G10L 5/04 |

OTHER PUBLICATIONS

Weischedel et al. "Coping with Ambiguity and Unknown Words through Probabilistic Models", Computational Linguistics, vol. 19, No. 2, pp. 359–382, Jun. 1993.

Chang et al., "Why Corpus–Based Statistics–Oriented Machine Translation", Proc. of the 4th Inter. Conf. on Theoretical & Methodological Issues in Machine Translation, pp. 249–262, Jun. 25, 1992.

Black et al., "Towards History–Based Grammars: Using Richer Models for Probabilistic Parsing," in *Proceedings of the 31$^{st}$ Annual Meeting of the Association for a Computational Linguistics,* Association for Computational Linguistics, 1993, pp. 31–37.

(List continued on next page.)

Primary Examiner—James P. Trammell
Assistant Examiner—Cuong H. Nguyen
Attorney, Agent, or Firm—Seed and Berry LLP

[57] ABSTRACT

A method and system for bootstrapping statistical processing into a rule-based natural language parser is provided. In a preferred embodiment, a statistical bootstrapping software facility optimizes the operation of a robust natural language parser that uses a set of lexicon entries to determine possible parts of speech of words from an input string and a set of rules to combine words from the input string into syntactic structures. The facility first operates the parser in a statistics compilation mode, in which, for each of many sample input strings, the parser attempts to apply all applicable rules and lexicon entries. While the parser is operating in the statistics compilation mode, the facility compiles statistics indicating the likelihood of success of each rule and lexicon entry, based on the success of each rule and lexicon entry when applied in the statistics compilation mode. After a sufficient body of likelihood of success statistics have been compiled, the facility operates the parser in an efficient parsing mode, in which the facility uses the compiled statistics to optimize the operation of the parser. In order to parse an input string in the efficient parsing mode, the facility causes the parser to apply applicable rules and lexicon entries in the descending order of the likelihood of their success as indicated by the statistics compiled in the statistics compilation mode.

16 Claims, 18 Drawing Sheets

U.S. PATENT DOCUMENTS

| | | | |
|---|---|---|---|
| 5,297,040 | 3/1994 | Hu | 704/9 |
| 5,418,717 | 5/1995 | Su et al. | 704/9 |
| 5,419,413 | 5/1995 | Kutsumi et al. | 704/4 |
| 5,495,413 | 2/1996 | Kutsumi et al. | 704/4 |
| 5,555,169 | 9/1996 | Namba et al. | 704/9 |
| 5,752,052 | 5/1998 | Richardson et al. | 704/9 |

OTHER PUBLICATIONS

Briscoe, T. and J. Carroll, "Generalized Probabilistic LR Parsing of Natural Language (Corpora) with Unification–Based Grammars," *Computational Linguistics,* 19(1):25–59, 1993.

Briscoe, T. and N. Waegner, "Robust Stochastic Parsing Using the Inside–Outside Algorithm," in *Proceedings of AAAI92 Workshop on Probabilistically–Based Natural Language Processing Techniques,* San Jose, CA, 1992, pp. 39–53.

Lari, K. and S. J. Young, "Applications of Stochastic Context–Free Grammars Using the Inside–Outside Algorithm," *Computer Speech and Language,* 5:237–257, 1991.

Lari, K. and S. J. Young, "The Estimation of Stochastic Context–Free Grammars Using the Inside–Outside Algorithm," *Computer Speech and Language,* 4:35–56, 1990.

Pereira, F. and Y. Schabes, "Inside–Outside Reestimation from Partially Bracketed Corpora," *Association for Computational Linguistics,* 1992, pp. 128–135.

Schabes et al., "Parsing the Wall Street Journal with the Inside–Outside Algorithm," *EAC,* 1993, pp. 341–347.

Su, Keh–Yih and Jing Shin Chang, "Why Corpus–Based Statistics–Oriented Machine Translation," *Proceedings of the Fourth International Conference on Theoretical and Methodological Issues in Machine Translation: Empiricist vs. Rationalist Methods in MT.* Jun. 1992, pp. 249–262.

Weischedel, Ralph et al., "Coping with Ambiguity and Unknown Words through Probabilistic Models," *Computational Linguistics,* vol. 19, No. 2, Jun. 1993, pp. 359–352.

METHOD AND SYSTEM FOR BOOTSTRAPPING STATISTICAL PROCESSING INTO A RULE-BASED NATURAL LANGUAGE PARSER

CROSS-REFERENCE TO RELATED APPLICATION

This application is a continuation of U.S. Pat. No. 5,752,052, issued on May 12, 1998, Ser. No. 08/264,845, filed Jun. 24, 1994.

TECHNICAL FIELD

The invention relates generally to a method and system for parsing natural language text, and, more specifically, to a method and system for bootstrapping statistical processing into a rule-based natural language parser.

BACKGROUND OF THE INVENTION

A natural language parser is a program that takes a segment, usually a sentence, of natural language (i.e., human language, such as English) text as input and produces as output for that segment a data structure, usually referred to as a parse tree. This parse tree typically represents the syntactic relationships between the words in the input segment. The parse tree may also represent certain semantic relationships.

Natural language parsers have traditionally been "rule-based." Such rule-based parsers store knowledge about the syntactic structure of a language in the form of linguistic rules, and apply these rules to the input text segment in order to obtain the resulting parse tree. The parser usually stores information about individual words, such as what part-of-speech they can represent, in a dictionary or "lexicon," which is accessed by the parser for each word in the input text prior to applying the linguistic rules.

Such rule-based parsers have the disadvantage that they require extensive amounts of both dictionary data and rule-writing labor by highly skilled linguists to create, enhance, and maintain. This is especially true if the parser is to have "broad coverage," that is, if it is to be able to parse "general" natural language text of many different types.

Recently, there has been increasing activity focused on using statistical methods to acquire information from large, annotated corpora of natural language text, and on using that information in statistical natural language parsers. Instead of being stored in the traditional form of dictionary data and linguistic rules, this information is represented as statistical parameters, or probabilities. These probabilities are usually then used in parsers together with simpler dictionary data and rules, thereby taking the place of much of the information created by skilled labor in rule-based systems.

Such a statistical parser is initially incapable of parsing "raw" input text. The statistical parser is first operated in a training mode, in which it receives input strings that have been annotated by a linguist with tags that specify parts of speech, syntactic function, etc. The statistical parser records statistics reflecting the application of the tags to portions of the input string. As an example, an input string such as the following might be used:

I perform parses.

A linguist would then add tags to the input string to produce the following tagged input string:

sentence(pronoun(("I") verb_phrase(verb("perform") noun ("parses")))

When the above tagged input string is submitted to the statistical parser in its training mode, it would adjust its statistics to the effect that each of the following parsing steps is more likely to be successful: "perform"→verb, "parses"→noun, verb noun→verb_phrase, "I"→pronoun, pronoun verb_phrase→sentence. After a significant amount of training using tagged input strings, the statistical parser enters a parsing mode, in which it receives raw, untagged input strings. In the parsing mode, the statistical parser applies the statistics assembled in the training mode in order to attempt to build a parse tree for the untagged input string.

The advantages of statistical parsers over rule-based parsers are in decreasing the amount of rule-writing labor required to create a high-quality parser and in being able to "tune" a parser to a particular type of text simply by extracting statistical information from the same type of text. The disadvantage of this approach is that a large body, or corpus, of natural language text is required that has been laboriously tagged.

There has been some discussion and work in the area of creating hybrid natural language processing systems that make use of both traditional rules and data as well as statistical methods for acquiring the linguistic knowledge required. According to a first hybrid approach, statistical methods are either (1) applied to a large tagged corpus or (2) used to model the linguistic accuracy of a parse structure as determined by human interaction. In the first case, the information obtained is used in a separate preprocessing step to select the parts-of-speech for words before parsing with a rule-based parser. In the second case, the information is used to determine the most likely syntactic parse or semantic interpretation after a rule-based parser has produced multiple alternatives. In neither case is the information actually applied during operation of the parser.

In a second approach, a rule-based parser is not used at all, but rather, traditional linguistic knowledge is used to determine, for example, the possible parts-of-speech for words, thus allowing words in untagged corpora to be grouped according to their possible parts-of-speech. Statistical methods are then applied over these groups, rather than over the words themselves, in order to obtain higher-level bigram and trigram language models that approximate the syntactic structure of each input string and that will be used later by a statistics-based parser. While these language models are indeed representative at some level of the input strings from which they were derived, they are still generally not as structurally rich and descriptive as the parse trees obtained by rule-based parsers.

SUMMARY OF THE INVENTION

It is an object of the invention to provide a method and system in a computer system for bootstrapping statistical processing into a rule-based natural language parser.

It is another object of the invention to provide a method and system in a computer system for expediting the operation of a natural language parser.

It is a further object of the invention to provide a method and system in a computer system for producing an accurate parse tree to represent a unit of natural language text.

It is a yet further object of the invention to provide a method and system for reiteratively enhancing a set of statistics used by a rule-based parser for parsing input strings of natural language text.

These and other objects, which will become apparent as the invention is more fully described below, are provided by a method and system for bootstrapping statistical processing into a rule-based natural language parser. In a preferred embodiment, a statistical bootstrapping software facility optimizes the operation of a robust natural language parser that uses a set of rules to combine words from an input string into syntactic structures. The facility first operates the parser in a statistics compilation mode, in which, for each of many sample input strings, the parser attempts to apply all applicable rules. While the parser is operating in the statistics compilation mode, the facility compiles statistics indicating the likelihood of success of each rule, based on the success of each rule when applied in the statistics compilation mode. After a sufficient body of likelihood of success statistics have been compiled, the facility operates the parser in an efficient parsing mode, in which the facility uses the compiled statistics to optimize the operation of the parser. In order to parse an input string in the efficient parsing mode, the facility causes the parser to apply applicable rules in the descending order of the likelihood of their success as indicated by the statistics compiled in the statistics compilation mode. In a preferred embodiment, the facility may also operate the parser in a hybrid mode, in which the facility uses a first set of compiled statistics to optimize the operation of the parser while compiling a second set of statistics.

DETAILED DESCRIPTION OF THE INVENTION

I. INTRODUCTION

A method and system for bootstrapping statistical processing into a rule-based natural language parser is provided. In a preferred embodiment, the invention comprises a statistical bootstrapping software facility ("the facility"), shown as element 208 in FIG. 2, for automatically compiling and using statistics to improve the performance of a rule-based natural language parser, which generates syntax trees to represent the organization of plain-text sentences. Such a parser uses a set of lexicon entries to identify the part of speech of words, and a set of rules to combine words from an input string into syntactic structures, or "records," eventually combining the records into a syntactic tree representing the entire input string. A parser is said to "apply" lexicon entries and rules in order to produce new records. A parser may apply a lexicon entry when the word to which it corresponds appears in the input string, and does so by creating a new record, then copying lexical information such as part of speech, person, and number from the lexicon entry to the created record. A parser may apply a rule that combines existing records by first evaluating conditions associated with the rule. If the conditions of the applied rule are satisfied, then the facility creates a new record and adds information to the created record, such as record type and information about the combined records, as specified by the rule.

Figure 1:
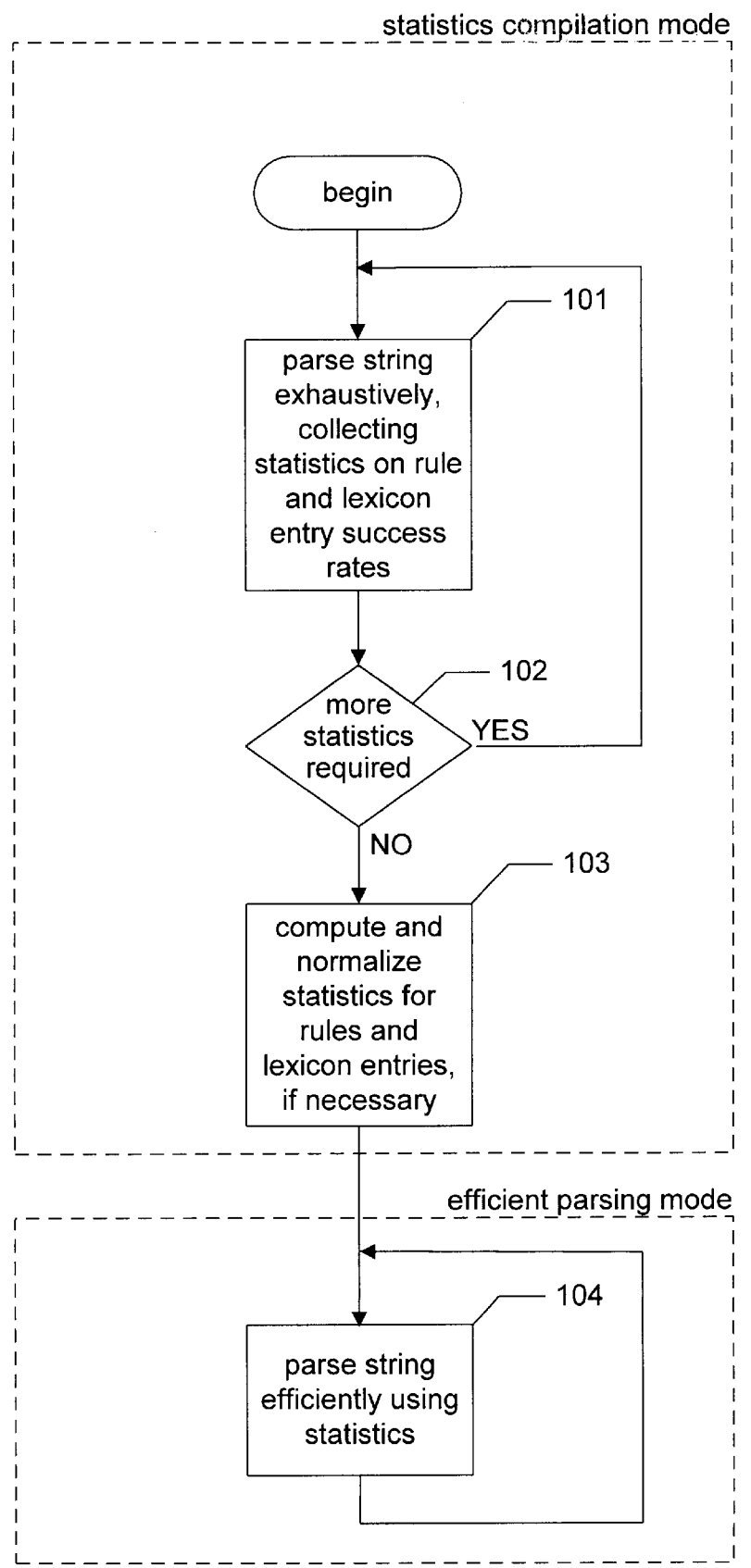
FIG. 1 is a flow diagram showing the overall operation of the statistical bootstrapping software facility.

The facility functions as a parser control program for a conventional rule-based parser. FIG. 1 is a flow diagram showing the overall operation of the facility. In step 101–103, the facility operates the parser in a statistics compilation mode, during which the facility compiles statistics indicating the success rate of the parser when it applies each lexicon entry and each rule while parsing a "corpus," or large sample of representative text. In this mode, the facility in steps 101–102 causes the parser to apply every rule and lexicon entry which may be applied ("applicable" rules and lexicon entries) to create "records," or prospective parse tree nodes. In step 103, the facility normalizes the compiled statistics, if necessary, so that the statistic for each rule may be compared to the statistic for each other rule and each lexicon entry. In step 104, the facility operates the parser in an efficient parsing mode, during which the parser preferably only applies rules and lexicon entries until a single syntax tree is produced for the input string being parsed, and therefore does not apply all applicable rules. In this mode, the parser applies applicable rules and lexicon entries in the order of the likelihood that the records created thereby will be contained in any given successful parse, based on the compiled statistics. In a preferred embodiment, the facility may also operate the parser in a hybrid mode, in which the facility uses a first set of compiled statistics to optimize the operation of the parser while compiling a second set of statistics. When the corpus parsed during the statistics acquisition mode is collected from a particular genre of material, the facility permits the parser to be "tuned" to that genre.

Figure 2:
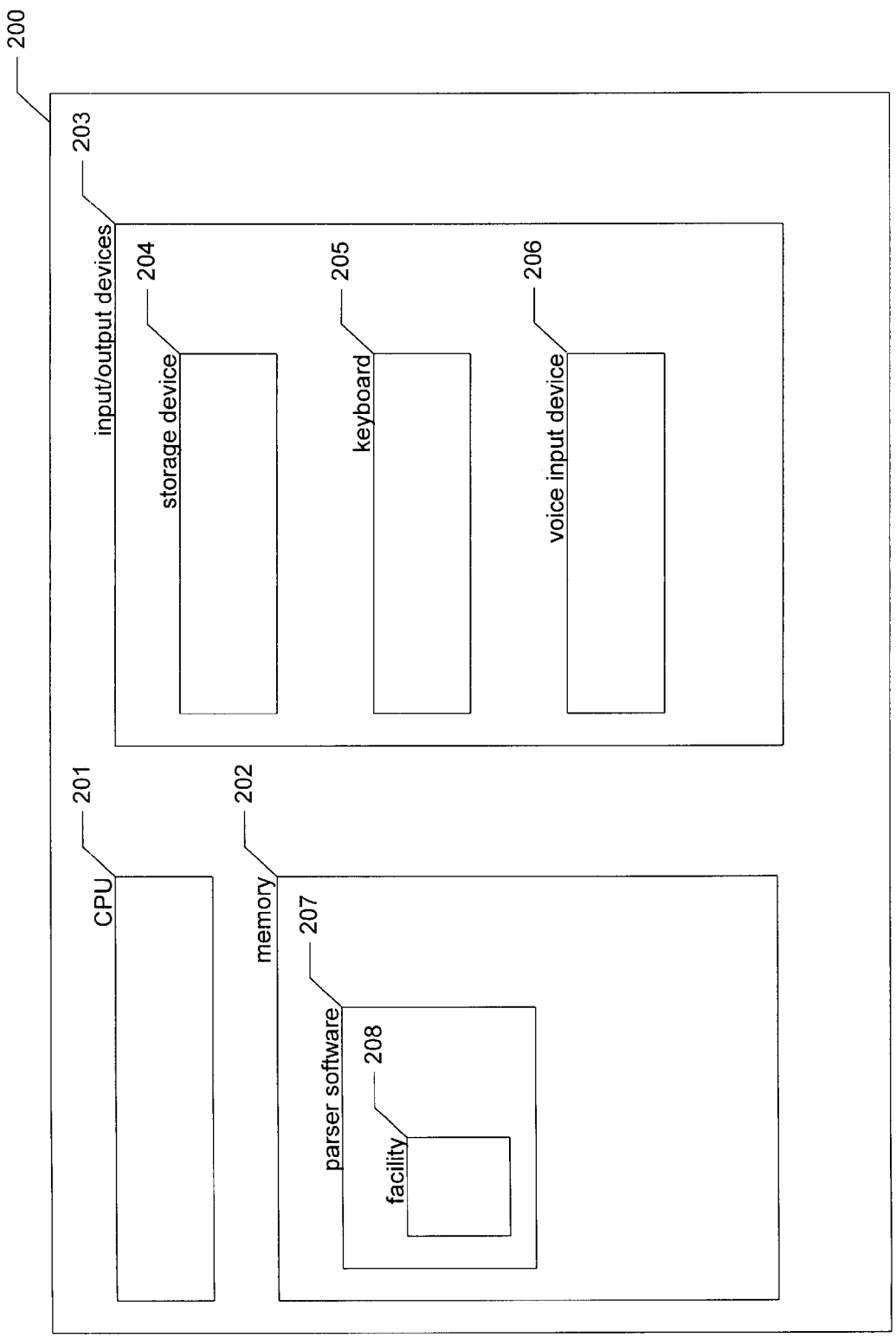
FIG. 2 is a high-level block diagram of the general-purpose computer system upon which the facility preferably operates.

FIG. 2 is a high-level block diagram of the general-purpose computer system upon which the facility preferably operates. The computer system 200 contains a central processing unit (CPU) 201, a computer memory (memory) 202, and input/output devices 203. Among the input/output devices is a storage device 204, such as a hard disk drive, a keyboard 205, and optionally a voice input device 206. The parser software 207 and the facility 208 preferably reside in the memory 202 and execute on the CPU 201. Input strings to be parsed by the parser may be retrieved from the storage device 204. Typed input strings may be received for parsing from keyboard 205, and spoken input strings received and interpreted by the voice input device 206. While the facility is preferably implemented on a computer system configured as described above, it may also be implemented on computer systems having different configurations.

II. PARSER

Figure 3A:
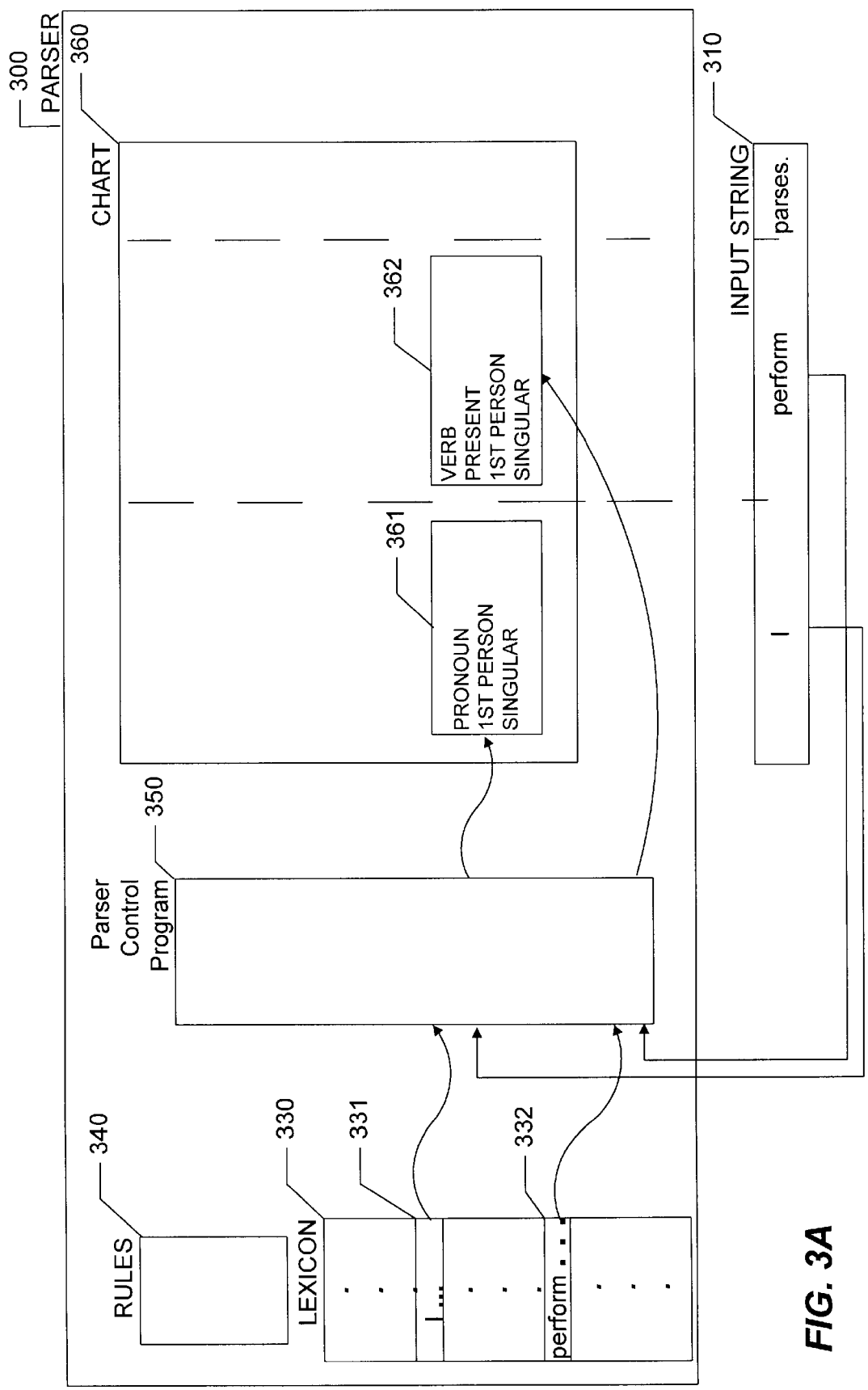
FIGS. 3A and 3B are block diagrams that demonstrate the operation of a typical parser 207 in which the facility 208 may be implemented.
Figure 3B:
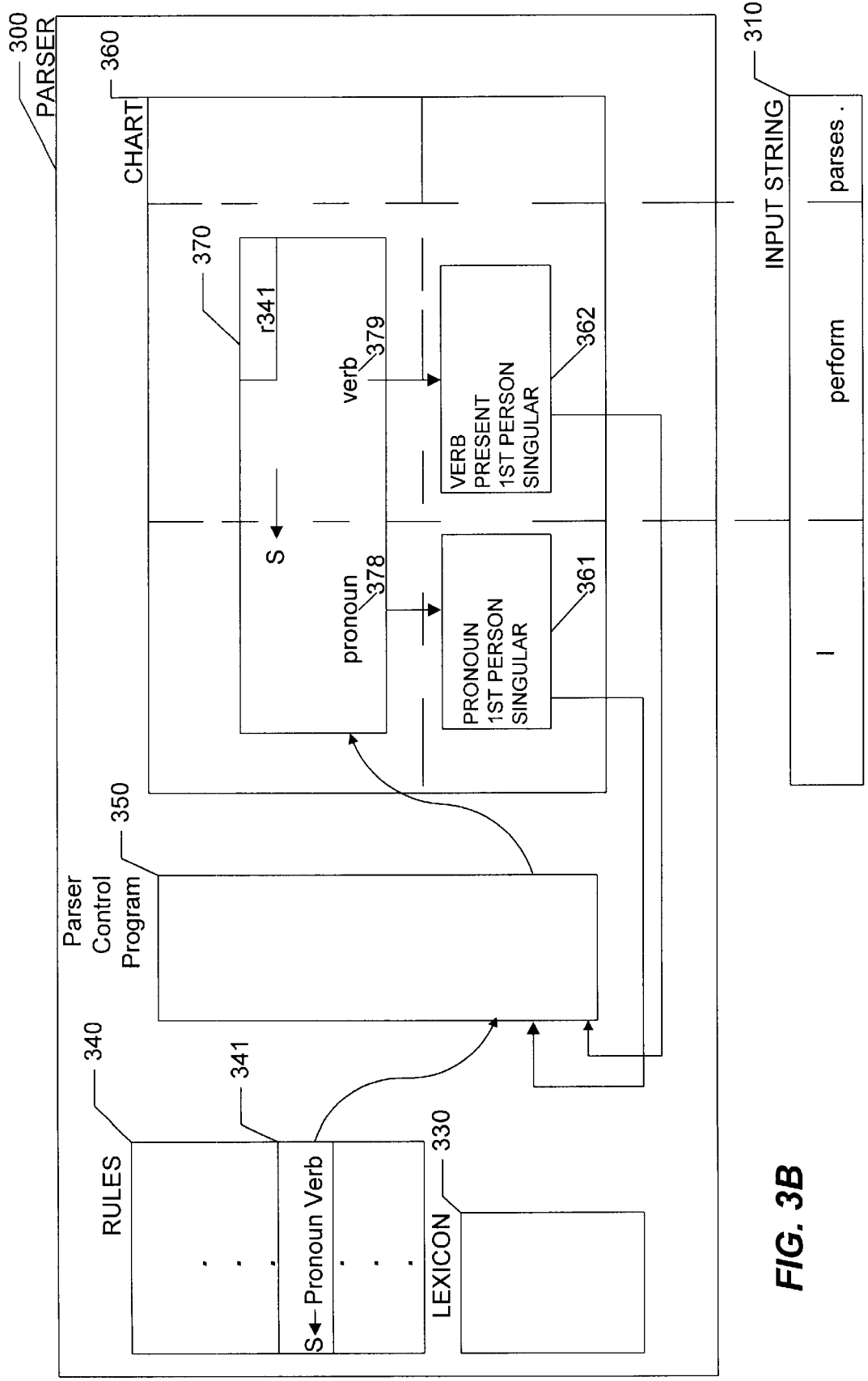

FIGS. 3A and 3B are block diagrams that demonstrate the operation of a typical parser 207 in which the facility 208 may be implemented. FIG. 3A shows the organization of the parser and demonstrates the application of entries in the lexicon. The parser 300 operates to parse an input string 310 (e.g., "I perform parses"). The parser is comprised of a lexicon 330 that contains one or more entries for each word known to the parser. Each lexicon entry specifies a part of speech for one word, as well as other associated information, such as person, number, and tense. As an example, the lexicon 330 contains lexicon entry 331 that specifies the word "I" has the part of speech "pronoun," the person "first person," and the number "singular." These values are usually encoded to reduce the size of the lexicon. The parser 300 also contains a set of augmented phrase structure grammar rules ("rules") 340, discussed in detail below. The parser 300 further contains a parser control program 350. The parser control program applies lexicon entries and rules to produce new records in a working area for assembling a syntax tree for the input string called a chart 360, in order to eventually produce one or more sentence records in the chart.

At the beginning of a parse of input string 310, the chart 360 contains no records. The parser control program 350 begins by selecting one or more lexicon entries corresponding to words in the input string 310 to apply, creating a record corresponding to each lexicon entry in the chart 360. (For words having more than one possible part of speech, the lexicon contains multiple entries. The parser control program may select one or more of these multiple lexicon entries for addition to the chart.) For instance, the parser control program selects lexicon entry 331, which corresponds to the word "I" in the input string 310, and creates record 361 in the chart when such a word appears in the input string 360. The record 361 contains information copied from the lexicon entry, e.g., the part of speech "pronoun," the person "first person," and the number "singular." In the same way, the rule lexicon application program 350 creates record 362 in the chart 360 by copying information from a lexicon entry 332 corresponding to the word "perform" in the input string 310. The process of creating a record in the chart from a lexicon entry for a word is also known as generating a lexical characterization of the word.

FIG. 3B demonstrates the application of the rules. For this and subsequent examples, a small set of simplified rules are described in order to facilitate the discussion. The rules 340 each specify the creation of a new record in the chart 360 to represent the combination of one or more records. The rules 340 are designed such that, by repeated application of various rules, a record is eventually created that represents the entire input string. Because the input string preferably corresponds to one sentence (but may correspond to any similar segment of text), the ultimate record is a record that represents an entire sentence, or a "sentence record." Each rule contains three parts: the type and order of records combined by the rule, the type of result record produced by the rule to represent the combination of the combined records, and conditions that regulate when a rule may create a result record. If the conditions are satisfied, the parser control program 350 creates a result record of the type specified by the rule in the chart 360. The process of creating a record in the chart from a rule is also known as generating a syntactic characterization of a group of words in the input string.

For instance, rule 341 specifies combining a pronoun followed by a verb into a Sentence. Rule 341 specifies that, in order for a result record to be created, the pronoun and verb must agree in person and number. Such a rule may be written as follows:

| rule # | created record type | combined record types | conditions |
| --- | --- | --- | --- |
| 341 | Sentence | pronoun verb | person, number agreement |

In order to combine records 361 and 362, representing a pronoun and a verb respectively, the parser control program 350 attempts to apply rule 341, since it combines a pronoun followed by a verb. The parser control program 350 evaluates the conditions of rule 341: as record 361 is first person and record 362 is first person, the records to be combined agree in person; as record 361 is singular and record 362 is singular, the records to be combined agree in number. Thus, the conditions of rule 361 are satisfied. The parser control program 350 therefore creates result record 370 in the chart to represent the combination of records 361 and 362 into a sentence, as shown by the transformation shorthand "S←pronoun verb." Records created from rules preferably contain a pointer to each combined record so that, when a sentence record is ultimately created that represents the entire input string (Result record 370 only represents the substring "I perform."), it is at the head of a syntax tree that represents the sentence at each level of syntactic detail. For example, the result record 370 contains a pronoun pointer 378 to record 361 and a verb pointer 379 to record 362. In the syntax tree, each leaf node corresponds to a record created from a lexicon entry, and each non-leaf node to a record created from a rule.

Many different designs for the parser control program 350 are possible for conventional parsers. According to the preferred embodiment of the present invention, the bootstrapping facility is substituted for the parser control program 350. As discussed in detail below, the facility, once in place, causes the parser 300 to function in two different modes. In the statistics compilation mode, the facility applies both lexicon entries and rules exhaustively. That is, a record is created in the chart 360 for every lexicon entry corresponding to each word in the input string, and the application of every rule having combined record types that appear in the chart is attempted. Concurrently, statistics are maintained on the success rate of each lexicon entry and each rule—that is, the frequency with which the lexicon entry or rule produces a record in the syntax tree created during a successful parse. In the efficient parsing mode, instead of applying lexicon entries and rules exhaustively, the facility applies them selectively: the facility 108 applies lexicon entries and rules in the order of their likelihood of success, as chronicled by the statistics compiled in the statistics compilation mode. In this manner, the lexicon entries and rules that are most likely to succeed are applied first, greatly reducing the total number of lexicon entries and ruled that must be applied before a typical parse succeeds. The facility may also preferably cause the parser to function in a third, hybrid mode. In the hybrid mode, the facility uses a first set of compiled statistics to optimize the operation of the parser while compiling a second set of statistics.

III. STATISTICS COMPILATION MODE

In the statistics compilation mode, corresponding to steps 101–102 in FIG. 1, the facility 208 exhaustively parses each input string of the corpus by applying every applicable lexicon entry and rule. After each exhaustive parse is complete, the facility determines whether the parse was successful, and updates success statistics for the lexicon entries and rules used accordingly. The facility preferably utilizes one of two alternative approaches to maintaining success statistics for the lexicon entries and rules. Both approaches involve detecting when an exhaustive parse of an input string from the corpus produces exactly one sentence record. In this case, the parse is said to "succeed," as are the rules and lexicon entries that are part of the parse tree descending from the single sentence record. The first approach involves storing the number of times the rule or lexicon entry produces a record in a parse tree headed by the only sentence record created by exhaustively parsing an input string. The first approach favors rules and lexicon entries that succeed often relative to other rules and lexicon entries, without regard for the number of times they are applied. The second approach involves storing a ratio of the number of times the rule or lexicon entry produces a record in a parse tree headed by the sole sentence record to the number of times the rule or lexicon entry is applied. The second approach favors rules and lexicon entries which, though they may not often be applied, almost always succeed when they are applied. In a preferred embodiment, the facility maintains several separate sets of success statistics for each rule, each corresponding to characteristics of the input text or of the parse of the input text up to the point at which the rule is attempted, as discussed further below. This permits the facility to take advantage of a correlation between the probability of a rule succeeding and these characteristics.

Figure 4:
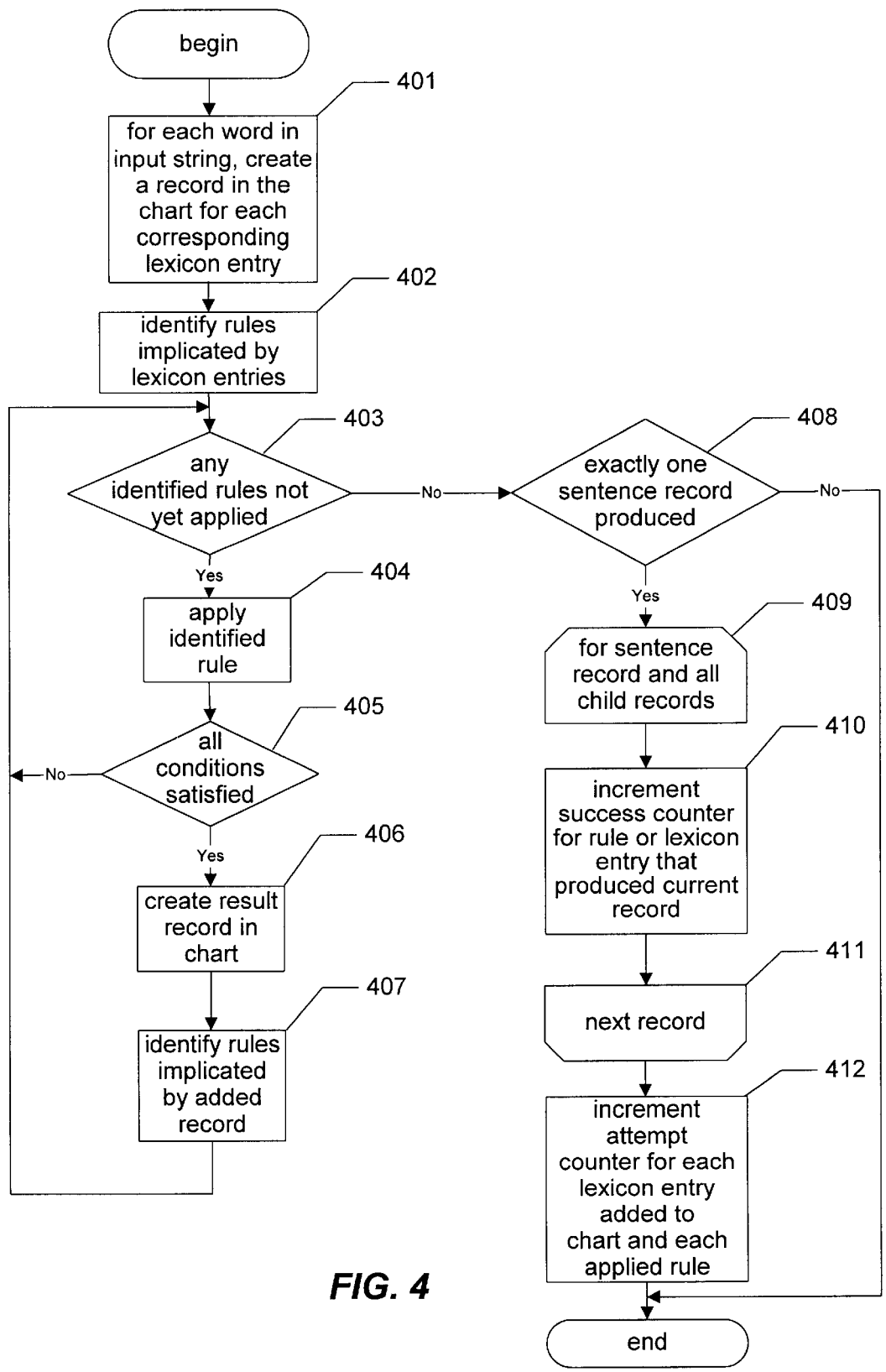
FIG. 4 is a flow diagram showing the steps performed by the facility 208 when parsing an input string in the statistics compilation mode.
Figure 5A:
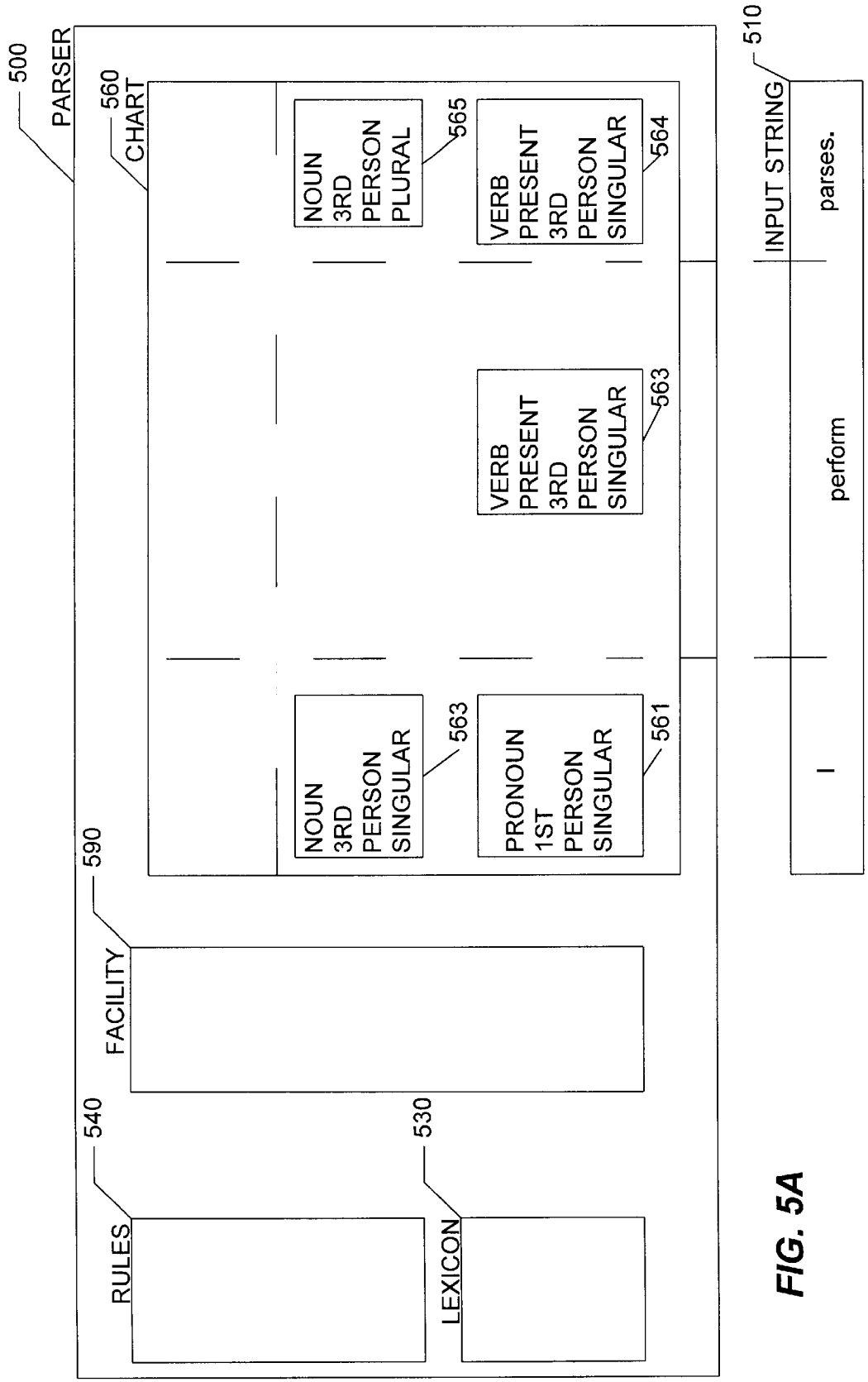
FIG. 5A shows the use of entries in the lexicon by the facility in the statistics compilation mode.

FIG. 4 is a flow diagram showing the steps performed by the facility 208 when parsing an input string in the statistics compilation mode. The steps shown are preferably repeated for each input string of the corpus, as shown by steps 101 and 102 of FIG. 1. In step 401, the parser first creates a record in the chart 360 for each lexicon entry corresponding to one of the words in the input string. FIG. 5A shows the application of the lexicon by the facility in the statistics compilation mode. Like FIGS. 3A–3B, it shows the parser 500, the input string 510, the lexicon 530, the rules 540, and the chart 560. However, the facility 590 has been substituted for the conventional parser control program. The chart 560 contains records 561, 562, 563, 564, and 565, produced by applying, or creating a record from, each lexicon entry corresponding to one of the words in the input string 510. For instance, the chart contains records 561 and 563, each corresponding to the word "I." Record 561 represents the first person, singular pronoun "I," while record 563 represents the third person, singular noun "I," i.e., the first Roman numeral.

After creating a record in the chart for each lexicon entry corresponding to one of the words in the input string, the facility attempts to apply all applicable rules in steps 402–408. In step 402, the facility identifies the rules implicated by the records created in the chart in step 401 for lexicon entries. That is, the facility identifies any rule for which the record types to be combined correspond to records of that type in the chart. In step 403, if there are identified rules that the facility has not yet applied, then the facility continues at step 404 to apply such a rule. In step 404, the facility applies a rule that has been identified but not yet applied, evaluating its conditions. In step 405, if the conditions of the applied rule are satisfied, then the facility continues at step 406, else the facility continues at step 403 to attempt to apply another rule if any remain identified but not yet applied. In step 406, the facility creates a result record in the chart combining one or more existing records as specified by the applied rule. As part of step 406, the facility stores pointers to the combined records in the newly created result record. The records to which pointers are stored are called child records of the newly created result record. In step 407, the facility identifies any rules implicated by the creation of the newly created result record. That is, the facility checks any rules that combine records of the type of the newly created result record to see if all of the records combined by the rules are in the chart, and, if so, identifies them for future application.

In step 408, if exactly one sentence record was created to represent the input string by attempting to apply all possible rules, the parse of input string 510 is deemed to have succeeded, and the facility continues at step 409 to update the statistics, else these steps conclude without updating the statistics. In steps 409–411, the facility loops through the single created sentence record and all descendant records of the sentence record (i.e., walks the single created syntax tree), incrementing the success counter for the rule or lexicon entry that produced each record. Step 409 marks the beginning of this tree-walking loop, and step 411 the end. These "loop limit" symbols are discussed on page 6 of ANSI/ISO 5807–1985, a standard for, among other things, symbols and conventions for program flowcharts promulgated by the International Standards Organization and adopted by the American National Standards Institute. In step 410, within the tree-walking loop, the facility increments the success counter for the current record of the tree-walking loop. Steps 409–411 are preferably performed for both the first and second approaches to success statistics maintenance. In step 412, the facility increments an attempt counter for each applied lexicon entry and applied rule in steps 405–407. In a preferred embodiment, instead of incrementing an attempt counter for each lexicon entry for which a record was added to the chart, the facility produces the same results by maintaining an attempt counter for each word that appears in the lexicon, and incrementing the attempt counter for each word appearing in the input string. Step 412 is not required for the first approach to success statistics maintenance, and is therefore preferably only performed for the second approach. These steps then conclude.

Figure 5B:
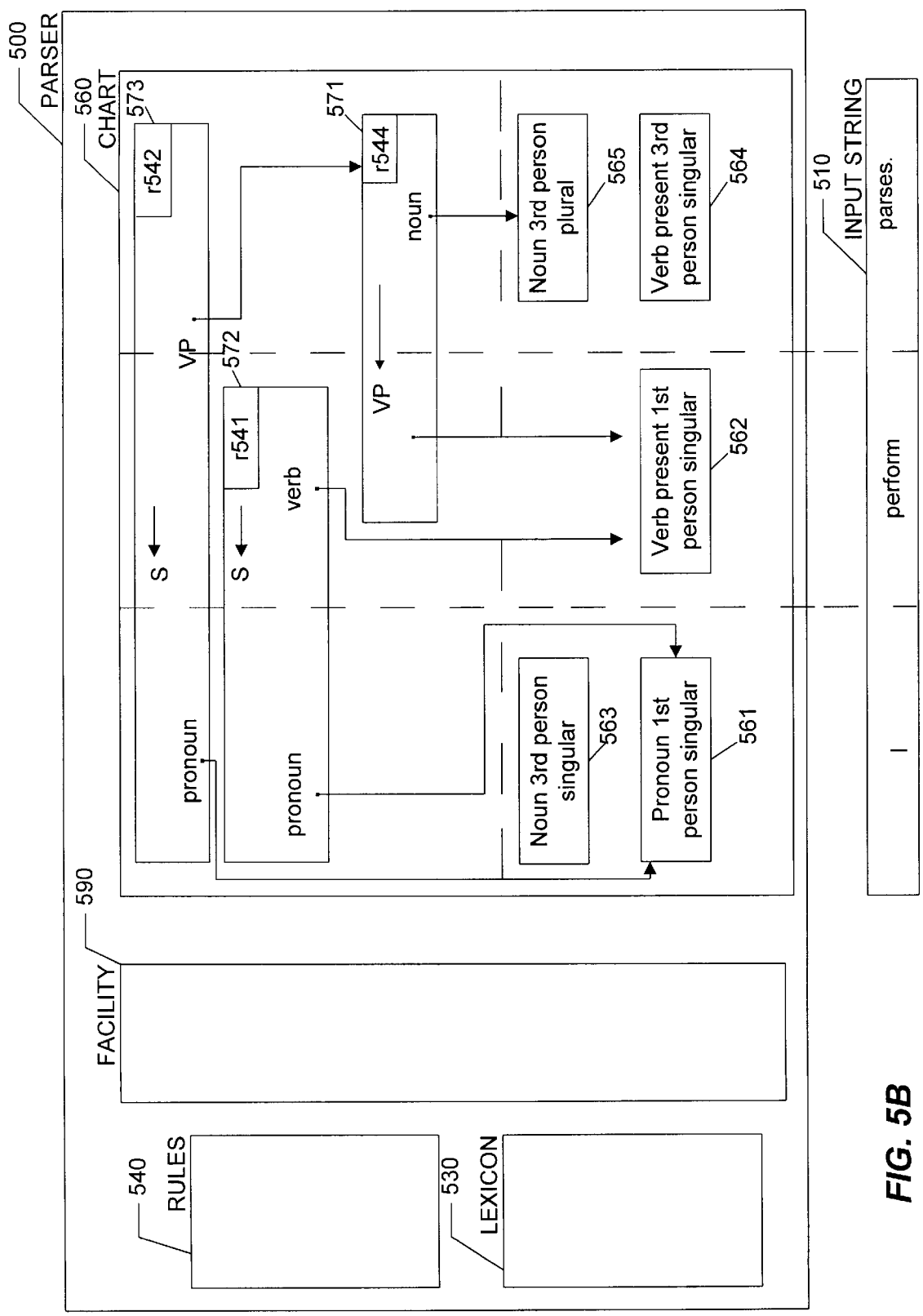
FIG. 5B shows the application of sample rules by the facility in the statistics compilation mode.

FIG. 5B shows the application of sample rules by the facility in the statistics compilation mode. For purposes of this example, the rules 540 are limited to the following:

| rule # | created record type | combined record types | conditions |
|---|---|---|---|
| 541 | Sentence | pronoun verb | person, number agreement |
| 542 | Sentence | pronoun Verb Phrase | person, number agreement |
| 543 | Sentence | noun verb | person, number agreement |
| 544 | Verb Phrase | verb noun | none |

Immediately after creating records in the chart for lexicon entries, the facility identifies the following rules in step 402: rule 541 for records 561 and 562, rule 543 for records 563 and 562, and rule 544 for records 562 and 565. The application of rule 541 produces record 572 of type Sentence. Since no rules combine records of type Sentence, no new rules are implicated by record 572, because records 561 and 562 agree in person and numbers. The application of rule 543 does not produce a result record in the chart, because records 563 and 562 disagree in person. The application of rule 544 produces record 571 of type Verb Phrase, because it has no conditions. Since Rule 542 combines records of type Verb Phrase, it is implicated by record 571, and therefore identified in step 408 for records 561 and 571. The application of rule 542 produces record 573, because records 561 and 571 agree in person and number. Since no rules combine records of type Sentence, no new rules are implicated by record 573. The identified rules are then exhausted.

In updating the success statistics, the facility determines that exactly one sentence record 573 was created to represent the entire input string. (Although another sentence record 572 was created, it does not represent the entire input string—it omits the word "parses.") The facility therefore updates the success statistics by incrementing success counters for rules 542 (which created record 573) and 544 (which created record 571) and the lexicon entries corresponding to records 561, 562, and 565. If the facility is applying the second approach to success statistics maintenance, it also increments attempt counters for rules 541, 542, and 544, which produced records in the chart, as well as rule 543, which did not. The facility then also increments attempt counters for the lexicon entries corresponding to records 561, 562, 563, 564, and 565, or, alternatively, attempt counters for the words "I," "perform," and "parses."

In many instances, there tends to be a correlation between the probability of a rule succeeding and characteristics either of the input string being parsed or of the parse of the input text up to the point at which the rule is applied. These characteristics are called "conditioning characteristics." By subdividing the success statistics according to conditioning characteristics, the facility can obtain success statistics that more reliably predict whether a particular rule will succeed if applied to certain records during the parse of a certain input string in the efficient parsing mode. The more reliably the facility is able to predict whether a rule will succeed in the efficient parsing mode, the fewer rules the facility must apply to produce a complete parse and the more efficient parsing becomes.

Conditioning characteristics having a significant correlation with the probability of a rule succeeding include the following: the number of words of the input string that will be represented by a result record if one is created by the rule; the number of words in the input string that follow the last word that will be represented by a result record if one is created by the rule; the smallest number of records presently in the chart that together represent the words in the input string that follow the last word that will be represented by a result record if one is created by the rule; the identities of the rules that created the records being combined by the rule (called "subordinate rules"); and characteristics of individual words that would be represented by a record produced by the rule, such as the word string itself, number, person, tense, or whether the word reflects a human attribute or action. The level of correlation tends to depend to a certain extent upon the approach of the linguist who codes the parser's rules. For instance, characteristics that deal with the distance from the end of a sentence tend to correlate well for rules coded in a manner that proceeds from the end of a sentence to the beginning. Distance from the beginning of a sentence characteristics may correlate more strongly for rules coded in an opposite, beginning-to-end manner.

The facility preferably subdivides the success statistic for each rule according to some or all of these characteristics. Specifically, the facility preferably maintains a multidimensional success statistic matrix for each rule. The matrix comprises a number of storage locations for holding a success statistic (a success counter and, in the case of the second approach to maintaining success statistics, an attempt counter), positioned so that each occurs at the intersection of one value for each of the characteristics that are dimensions of the matrix. When a success statistic is updated in the statistics compilation mode or used to determine the probability of success of a rule in the efficient parsing mode, the facility determines the current value of each characteristic that is a dimension of the matrix, and uses these values to access the correct success statistic in the matrix.

In the embodiment in which a number of conditioning characteristics are used to subdivide the success statistics, the facility's increasing demand on storage space may exceed available storage resources. For this reason, it is desirable to compact the success statistics information. Because the success statistics information is typically relatively sparse (E.g., a rule that transforms a noun into a noun phrase would never be applied or succeed to combine more than one word, so all of the success statistics corresponding to applications of that rule to combine more than one word are zero.), in a preferred embodiment, the facility stores probability statistics in a hash table. Hashing is well known to those skilled in the art, and is preferably applied straightforwardly in the facility to hash from rule identity and the other success statistic dimensions (e.g., number of words combined, words to end, records to end, subordinate rule identities) to a memory location large enough to store a success counter, and, in the case of the second approach to success statistics maintenance, an attempt counter. Normalized probabilities, as discussed in the following paragraph, may also preferably be stored at this location.

Because success statistics for rules are compared to success statistics for lexicon entries when the facility selects the next rule or lexicon entry to apply in the efficient parsing mode, it is important that success statistics for rules and success statistics for lexicon entries be comparable. In the second approach to success statistic maintenance, raw success statistics for lexicon entries as a whole are typically much larger than raw success statistics for rules. As a result, most applicable lexicon entries are attempted before the first applicable rules. In order to address this imbalance, the facility preferably normalizes the success statistics for rules with those for lexicon entries at the conclusion of the statistics compilation mode. This involves maintaining two overall success statistics (that is, for each, a success counter and an attempt counter) during the statistics compilation mode that have not yet been discussed: one for rules, and the other for lexicon entries. The ratio of the overall rule success statistic to the overall lexicon entry success statistic, called the overall probability ratio, is used to normalize the success statistics for rules with those for lexicon entries as described below.

Figure 6:
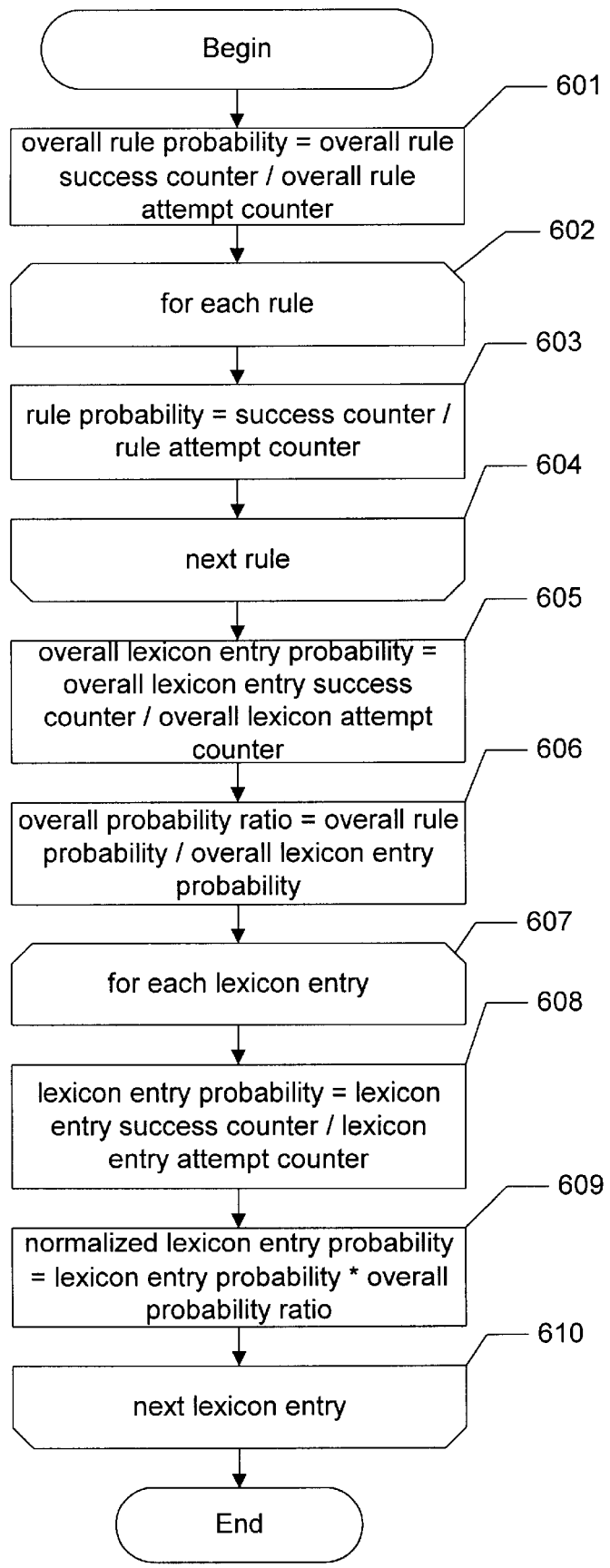
FIG. 6 is a flow diagram showing the steps performed by the facility in order to normalize rule success statistics with lexicon entry success statistics.

FIG. 6 is a flow diagram showing the steps performed by the facility in order to normalize rule success statistics with lexicon entry success statistics. In step 601, the facility divides the overall rule success counter by the overall rule attempt counter to obtain the overall probability that any rule will produce a record in a single parse tree during a parse that produces a single parse tree. In step 602–604, the facility loops through all of the rules, calculating a rule probability for each. Step 602 marks the beginning of this rule loop, and step 604 the end. In step 603, the facility calculates a rule probability for the rule by dividing the success counter for the rule by the attempt counter for the rule. Step 603 is repeated for each rule. In the embodiment in which multiple separate probability statistics are maintained for each rule, step 603 is similarly repeated for each of the multiple probability statistics for each rule. Steps 605–610 mirror steps 601–604 lexicon entry statistics. In step 605, the facility divides the overall lexicon entry success counter by the overall lexicon entry attempt counter to obtain the overall probability that any lexicon entry will produce a record in a single parse tree during a parse that produces a single parse tree. In step 606, the facility calculates an overall probability ratio that the facility uses to normalize lexicon entries to be comparable to rule probabilities by dividing the overall rule probability by the overall lexicon entry probability. In step 607–610, the facility loops through all of the lexicon entries, calculating and normalizing a lexicon entry probability for each. Step 607 marks the beginning of this lexicon entry loop, and step 610 the end. In step 608, the facility first calculates a "raw" lexicon entry probability for the lexicon entry by dividing the success counter for the lexicon entry by the attempt counter for the lexicon entry. In step 609, the facility then calculates the normalized lexicon entry probability by multiplying the raw lexicon entry probability by the overall probability ratio. Steps 608–609 are repeated for each lexicon entry.

IV. EFFICIENT PARSING MODE

Figure 7:
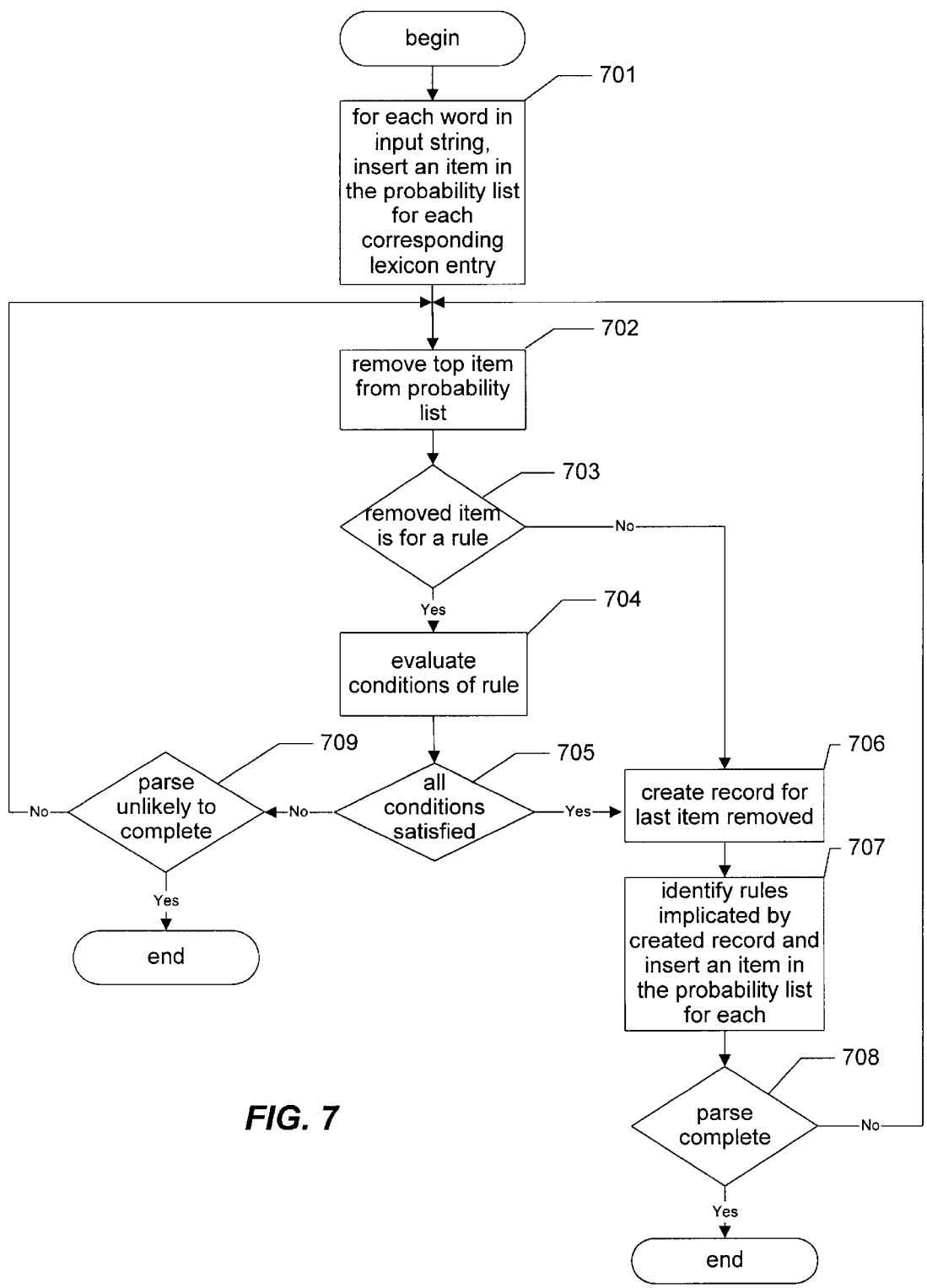
FIG. 7 is a flow diagram showing the steps performed by the facility when parsing an input string in the efficient parsing mode.

In the efficient parsing mode corresponding to step 104 of FIG. 1, the facility efficiently parses input strings by applying applicable lexicon entries and rules in the order of their likelihood to produce a record in a single parse tree as indicated by their success statistics. FIG. 7 is a flow diagram showing the steps performed by the facility when parsing an input string in the efficient parsing mode. The steps shown are preferably repeated for each input string presented in the efficient parsing mode, as shown by step 103 of FIG. 1. Briefly, the steps shown apply rules and lexicon entries in accordance with a probability list. The probability list is a list of items, each representing either a rule or a lexicon entry, that are sorted by the success statistic of the represented rule or lexicon entry so that the closer a list entry is to the top of the list, the more likely the rule or lexicon entry that it represents is to succeed. Items are inserted in the list for lexicon entries and rules as soon as the lexicon entry or rule becomes applicable: for lexicon entries, this is immediately at the beginning of the parse, since lexicon entries can only be implicated by words in the input string, and no words are added to the input string during parsing; for rules, this is as soon as records of the type combined by the rule are present in the order specified by the rule in the chart. When the next rule or lexicon entry is to be applied, the facility removes the top item from the probability list and applies the rule or lexicon entry that it represents.

In step 701, the facility inserts an item into the probability list for each lexicon entry in the lexicon that corresponds to one of the words in the input string. Each time the facility inserts an item in the probability list, the facility inserts the entry at a position such that the probability list remains sorted from the most likely to succeed rule or lexicon entry to the least likely to succeed. In the embodiment in which different success statistics are stored for each rule in a success statistics matrix, the facility identifies the characteristic values for the prospective application of the rule to the present input string and uses them to retrieve the correct success statistic from the matrix. In steps 702–707, the facility processes one probability list entry. In step 702, the facility removes the top item from the probability list. In step 703, if the removed item represents a rule, then the facility continues at step 704, else the facility continues at step 706. In step 704, the facility evaluates the conditions of the rule corresponding to the removed item. In step 705, if the conditions of the rule are satisfied, then the facility continues at step 706, else the facility continues at step 709. In step 706, the facility creates a record in the chart for the applied rule or lexicon entry corresponding to the removed probability list item. For items corresponding to lexicon entries, step 706 involves copying information, e.g., part of speech, into a new record in the chart. For items corresponding to rules, step 706 involves copying information from the constituent records combined by the rule into a new record as specified by the rule, as well as preferably storing pointers to the constituent records in the new record. In step 707, the facility identifies any rules implicated by the record created in step 706 and inserts a new item in the probability list for each. Step 707 is preferably facilitated by maintaining an index of the rules according to the types of records combined by each rule, which the facility consults to quickly determine which rules may be implicated by the creation of a result record in step 706. In step 708, if the parse has been completed by the creation of the new record in step 706, then these steps conclude, else the facility continues at step 702 to remove the next item from the probability list. The facility preferably determines whether the parse has been completed by determining whether the record created in step 706 is a sentence record. If so, the facility deems the parse to have completed.

In step 709, if the parse in unlikely to complete, then the facility aborts the parse and these steps conclude, else the facility continues at step 702 to remove the next item from the probability list. The facility preferably uses parsing cutoff thresholds to determine whether the parse is unlikely to complete. The facility preferably has a configurable parsing cutoff threshold. When the number of rules that have been applied whose success statistic is less than the overall rule probability exceeds a second threshold times the number of words in the input string, the facility also determines that the parse is unlikely to complete.

Figure 8A:
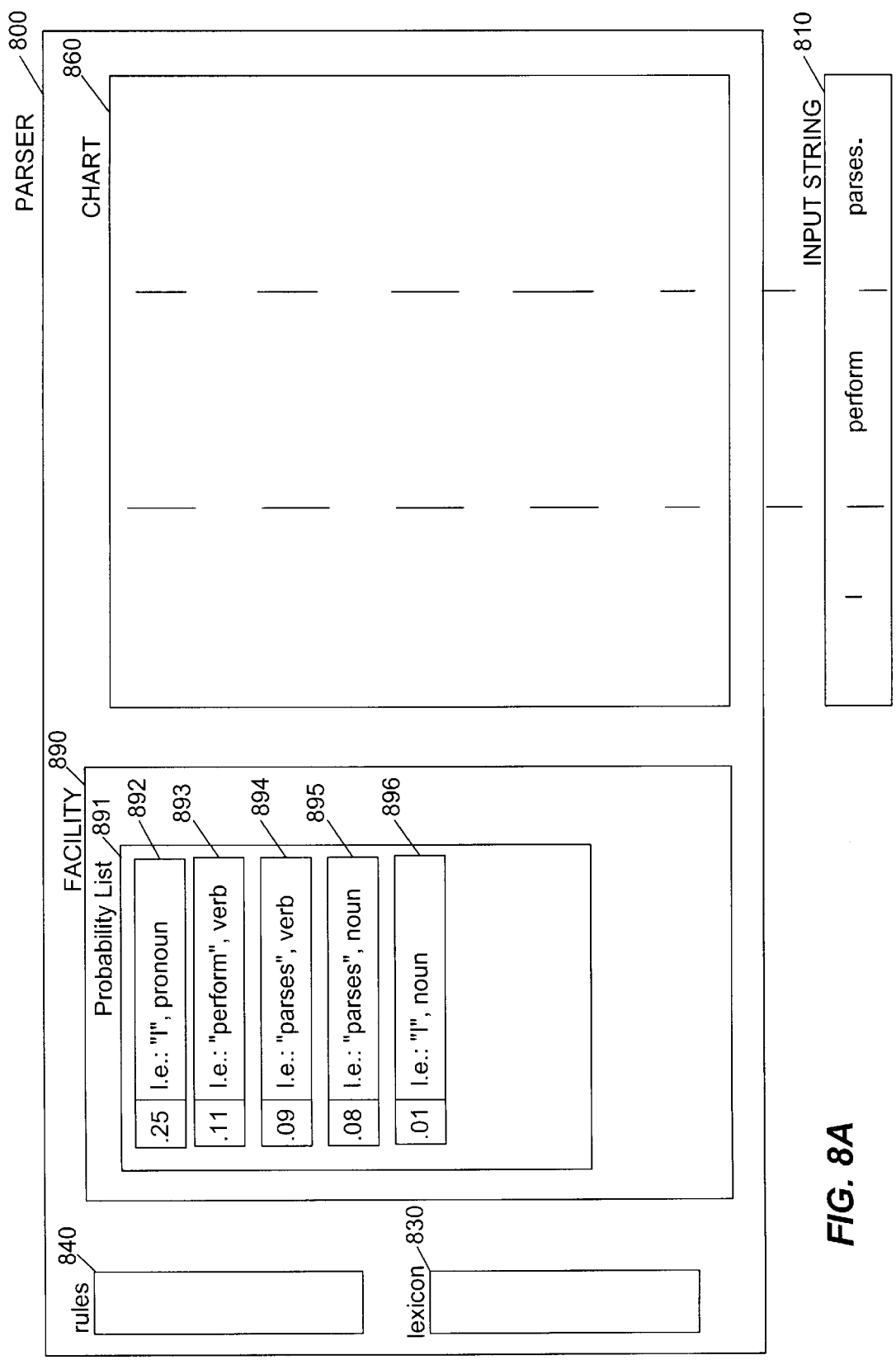
FIGS. 8A–8E illustrate the parsing of the parsing of a sample input string by the facility in the efficient parsing mode.

FIGS. 8A–8E illustrate the parsing of the parsing of a sample input string by the facility in the efficient parsing mode. This example uses the list of rules that appears above in Section III, and uses success statistics maintained according to the second approach described above. FIG. 8A shows the parser after items have been added to the probability list for lexicon entries. The facility 890 contains the probability list 891. The probability list 891 contains probability list items 892, 893, 894, 895, and 896. For example, the most likely probability list item is item 892, a lexicon entry item for the pronoun "I," which has a success statistic of 0.25. The least likely item is item 896, a lexicon entry item for the noun "I," which has a success statistic of 0.01.

Figure 8B:
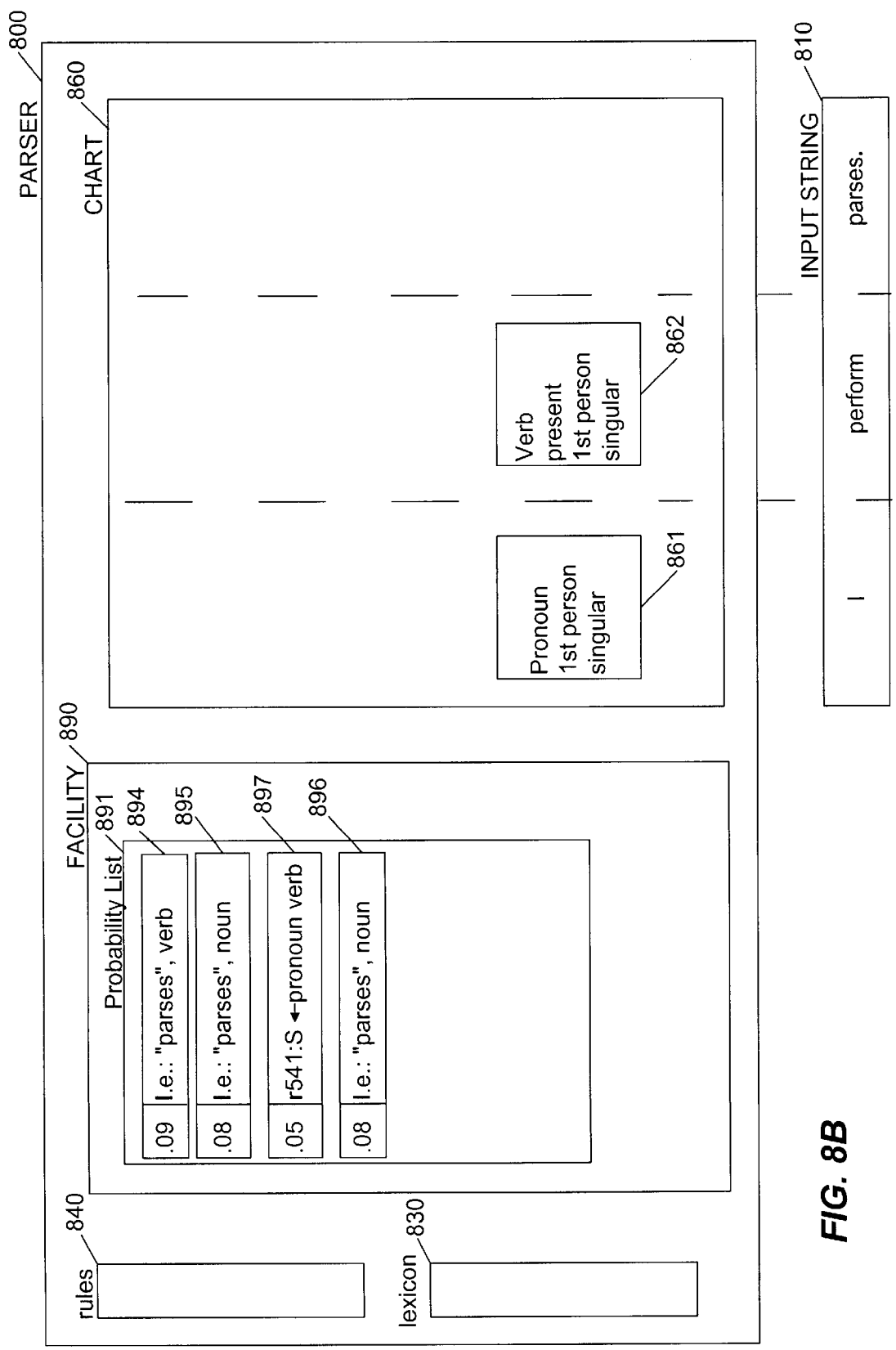

FIG. 8B shows the parser after probability list items 892 and 893 have been processed. The facility has removed former top probability list items 892 and 893 from the probability list 891, applying the corresponding lexicon entries to create pronoun record 861 and verb record 862 in the chart 860, respectively. Adding record 862 to the chart implicated rule 541, which combines a pronoun record and a verb record. The facility therefore inserted item 897 having success statistic 0.05 in the probability list between items 895 and 896 to represent rule 541.

Figure 8C:
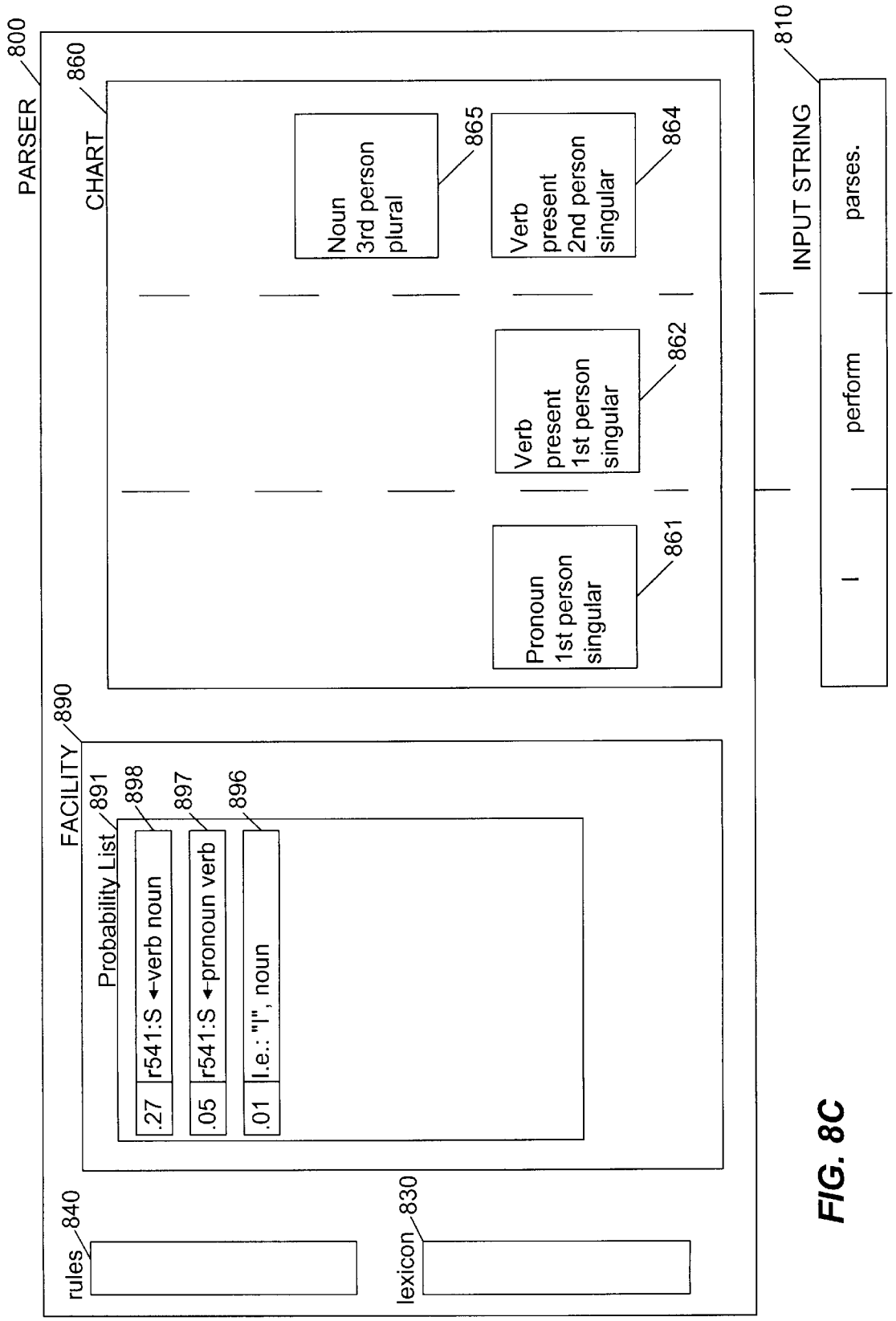

FIG. 8C shows the parser after probability list items 894 and 895 have been processed. The facility has removed former top probability list items 894 and 895 from the probability list 891, applying the corresponding lexicon entries to create verb record 864 and noun record 865 in the chart 860, respectively. Adding record 865 to the chart implicated rule 544, which combines a verb record and a noun record. The facility therefore inserted item 898 having success statistic 0.27 in the probability list before item 897 to represent rule 544.

Figure 8D:
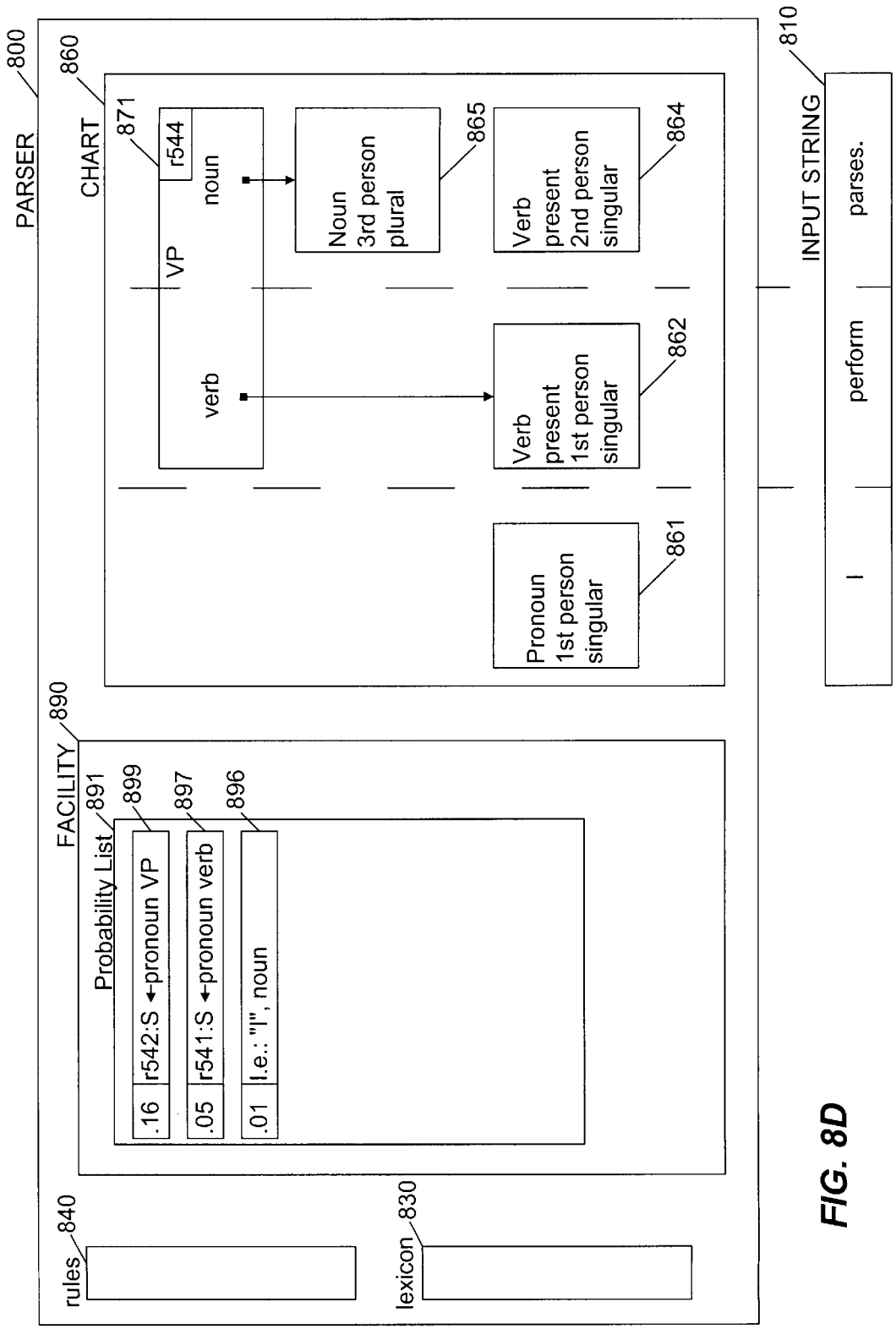

FIG. 8D shows the parser after probability list item 898 has been processed. The facility has removed former top probability list item 898 from the probability list 891, applying rule 544 to create Verb Phrase record 871 in the chart 860. Adding record 871 to the chart implicated rule 542, which combines an adjective record and a Verb Phrase record. The facility therefore inserted item 899 having success statistic 0.16 in the probability list before item 897 to represent rule 542.

Figure 8E:
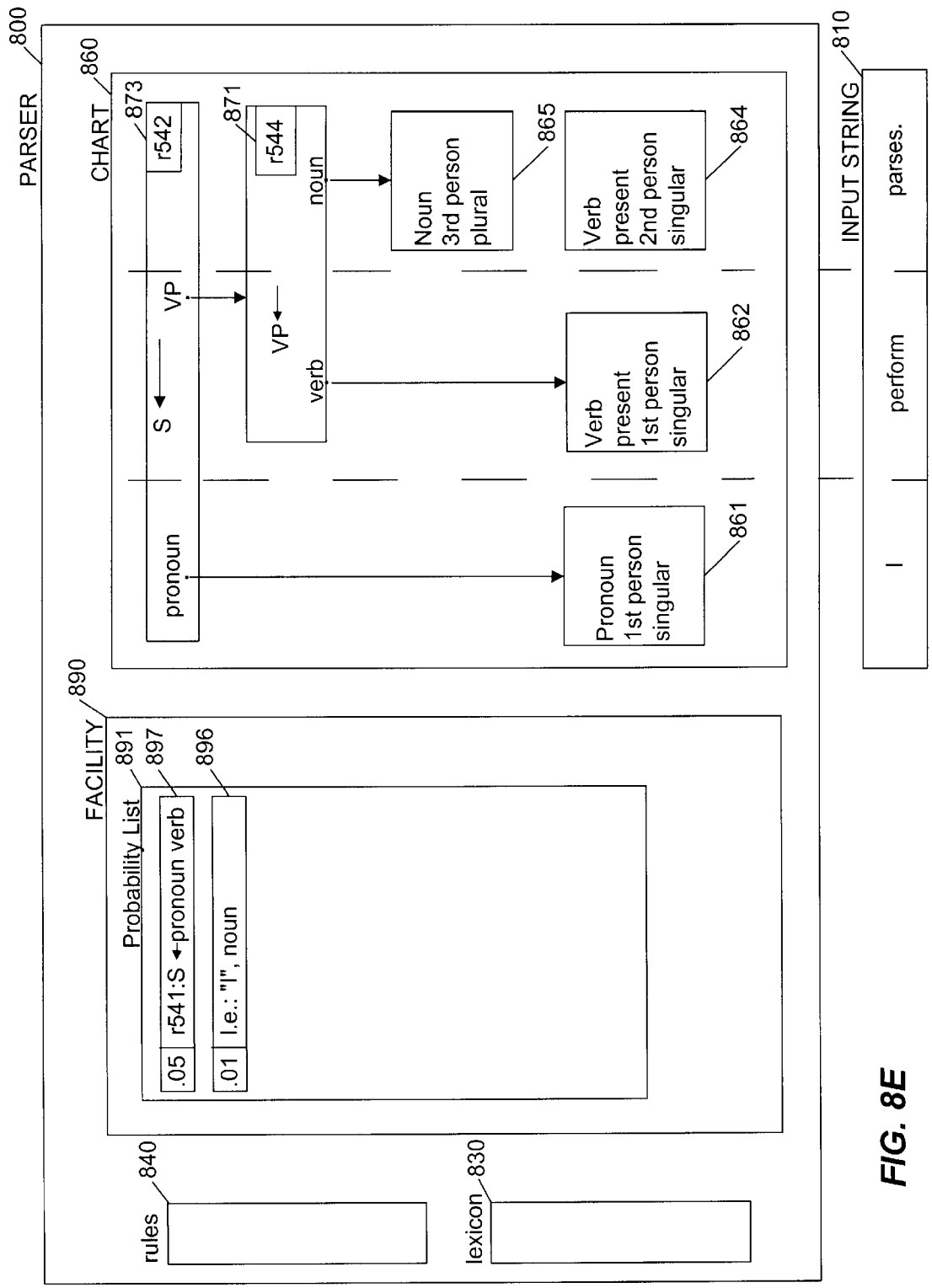

FIG. 8E shows the parser after probability list item 899 has been processed. The facility has removed former top probability list item 899 from the probability list 891, applying rule 542 to create Sentence record 873 in the chart 860. Because record 873 is a Sentence record, adding it to the chart marked the end of parsing input string 810.

The above described parsing of the example input string in the efficient parsing mode demonstrates the efficiency benefits of the facility. Probability list items 897 and 896 were never processed, preventing the overhead required to evaluate the conditions of one rule (541) and create two records in the chart. Also, by preventing the creation of a noun record in the chart by the lexicon entry represented by item 896, the facility also avoided the overhead required to evaluate the conditions of a second rule (543) and create a third record in the chart therefrom.

In addition, the facility provides accuracy advantages. By applying rules and lexicon entries in the order of their likelihood to produce a successful parse, in most cases the facility causes the parser to produce first the parse tree having the highest probability of being correct.

V. HYBRID PARSING MODE

The facility is preferably also able to compile a new set of statistics while using an existing set of statistics to parse accurately and, in certain cases, efficiently. In each case, the facility generates new statistics and incorporates them either into the existing body of statistics, or into a new body of statistics.

Figure 9A:
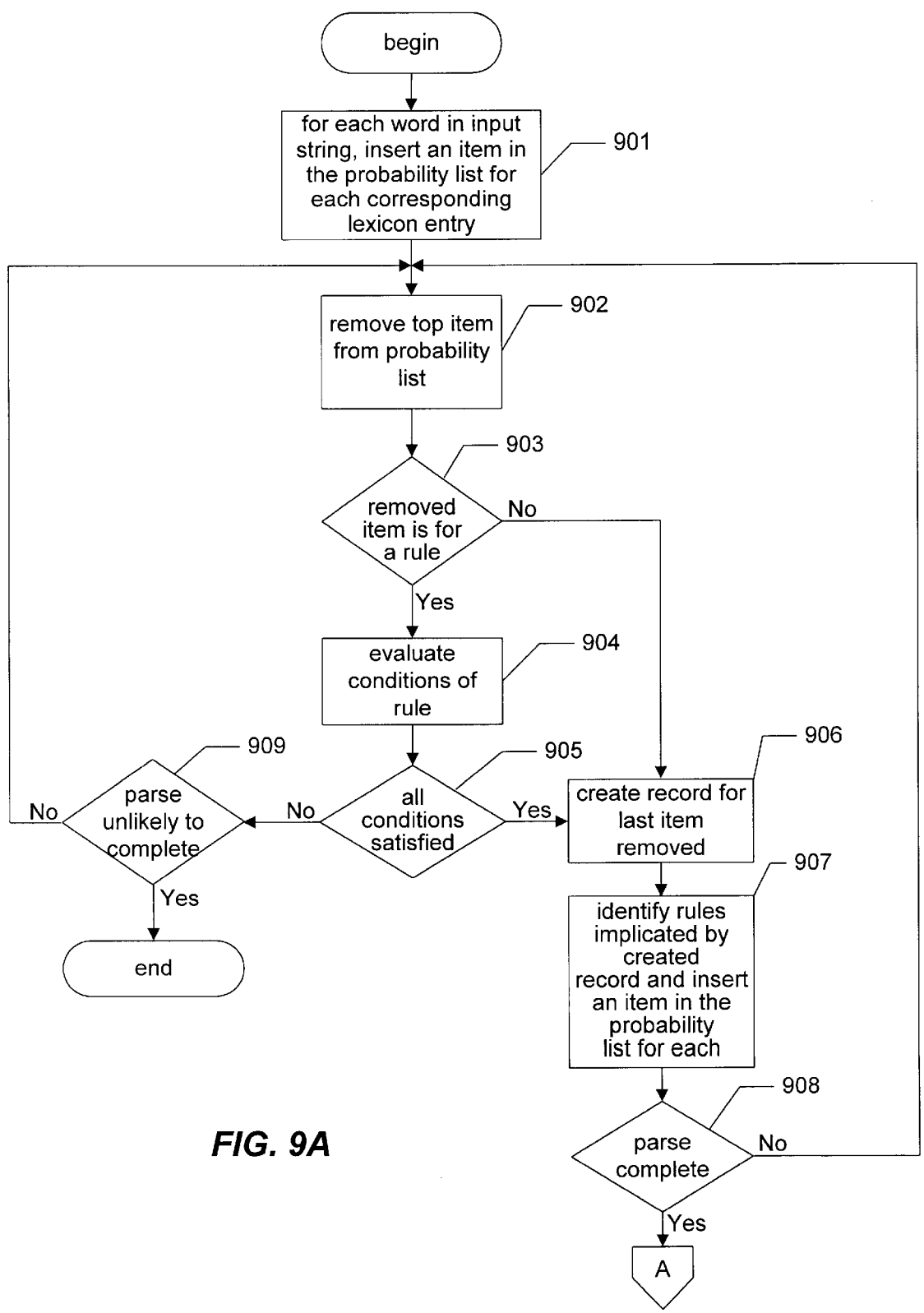
FIGS. 9A–9B are a flow diagram showing the steps performed by the facility to parse an input string in the hybrid parsing mode using the first approach to maintaining success statistics.
Figure 9B:
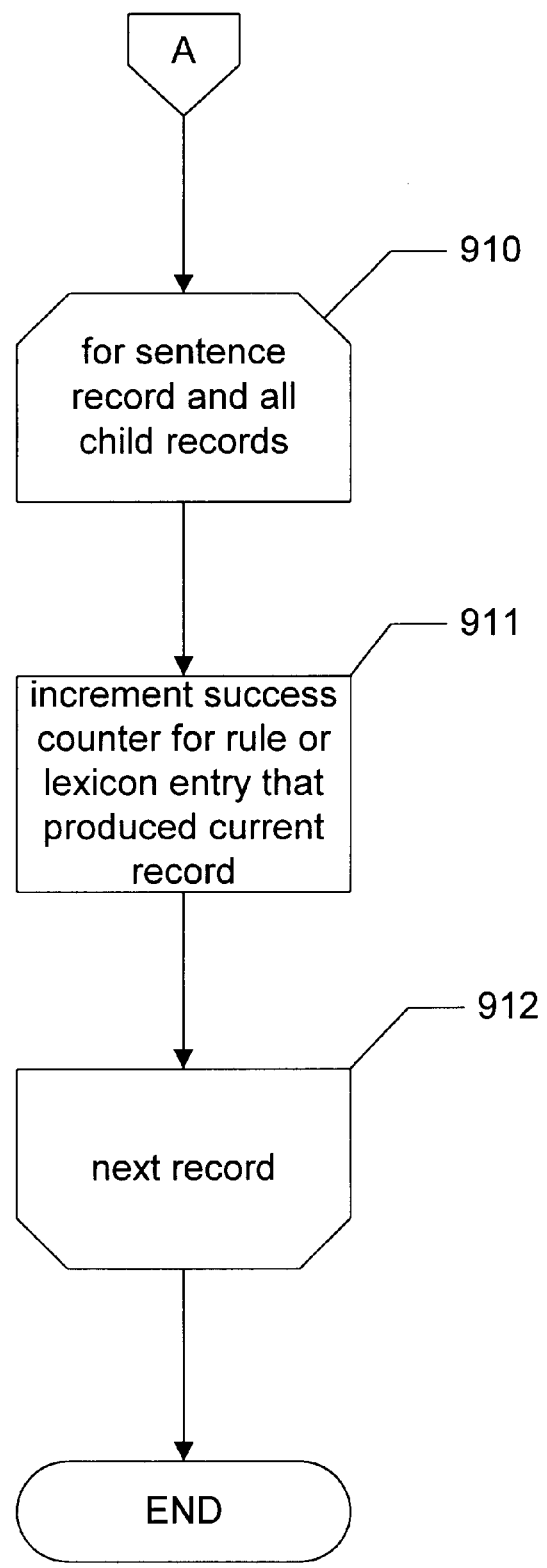

When using the first approach to maintaining success statistics, the facility is able to compile a new set of statistics while using an existing set of statistics to parse accurately and efficiently. In this case, the facility parses an input string by performing steps similar to those performed in the efficient parsing mode. FIGS. 9A–9B are a flow diagram showing the steps performed by the facility to parse an input string in the hybrid parsing mode using the first approach to maintaining success statistics. Steps 901–909 parallel steps 701–709 shown in FIG. 7 exactly to apply lexicon entries and rules in descending order of their likelihood of success until a sentence record is created. In step 908, if the parse is complete, then the facility continues through connector A at step 910. In steps 910–912, the facility walks the single created syntax tree, incrementing the success counter for the rule or lexicon entry that produced each record, as in steps 409–411 shown in FIG. 4. As noted above, these can be either the success counters presently in use, or a new body of success counters to be substituted for the existing success counters after a certain amount of parsing in the hybrid parsing mode.

Figure 10A:
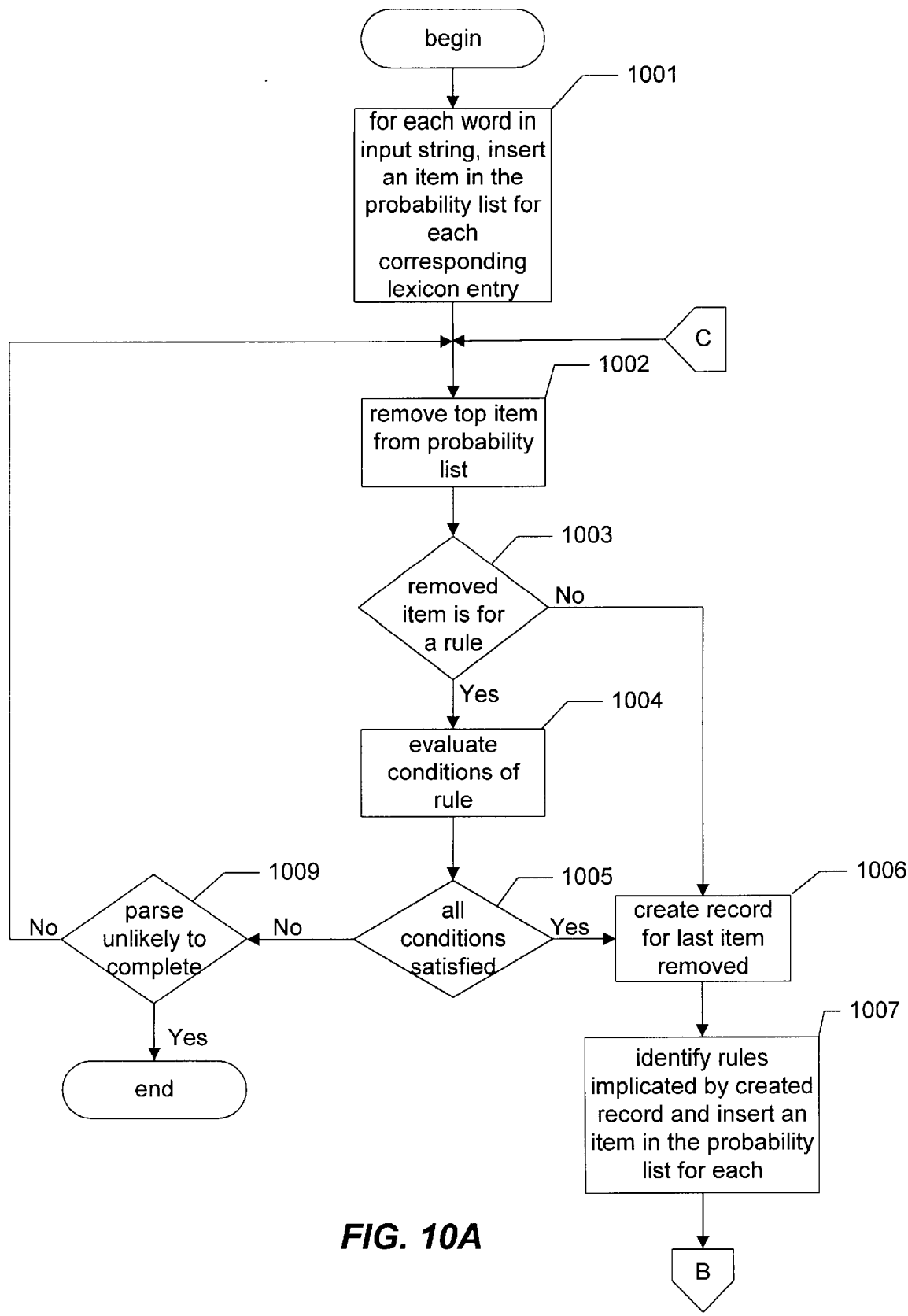
FIGS. 10A–10B are a flow diagram showing the steps performed by the facility to parse an input string in the hybrid parsing mode using the second approach to maintaining success statistics.
Figure 10B:
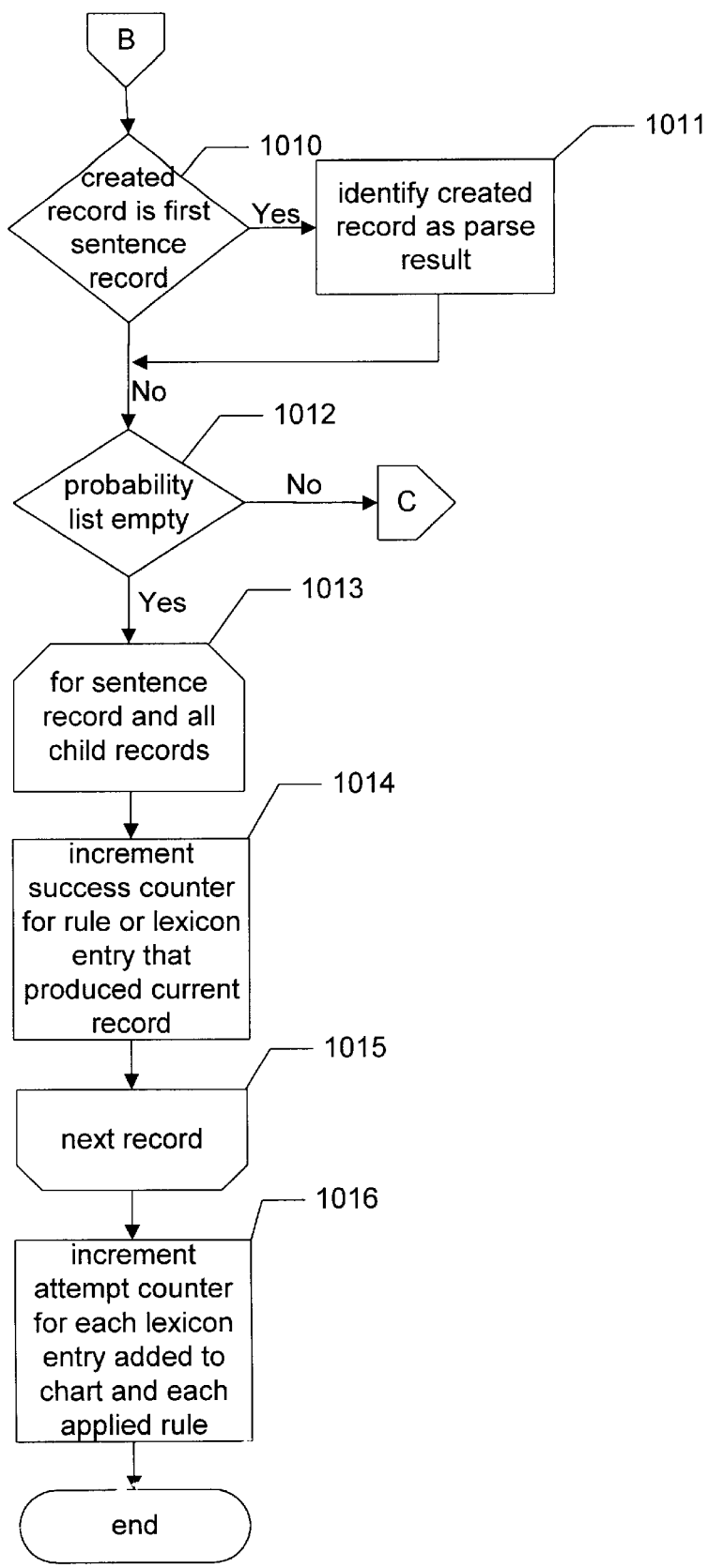

When using the second approach to maintaining success statistics, the facility is able to compile a new set of statistics while using an existing set of statistics to parse accurately. FIGS. 10A–10B are a flow diagram showing the steps performed by the facility to parse an input string in the hybrid parsing mode using the second approach to maintaining success statistics. Because this parse applies all applicable rules and lexicon entry, it is exhaustive, not efficient. Steps 1001–1007 parallel steps 701–707 shown in FIG. 7 exactly to apply lexicon entries and rules in descending order of their likelihood of success. New steps 1010–1016 occur after 1007. After performing step 1007, the facility continues through connector B at step 1010. In step 1010, if the record created in step 1006 is the first sentence record created for this input string, then the facility continues at step 1011, else the facility continues at step 1012. In step 1011, the facility identifies the record created in step 1006 as the parse result, since it was created first and has the highest likelihood of representing the correct parse. In step 1012, if the probability list is empty, then the exhaustive parse is complete and the facility continues at step 1013, else the facility continues through connector C at step 1002 to remove the next item from the probability list. Steps 1013–1016 parallel steps 409–412 shown in FIG. 4 exactly to update the statistics according to the second approach. In steps 1013–1015, the facility walks the first created syntax tree, incrementing the success counter for the rule or lexicon entry that produced each record, as in steps 409–411. In step 1016, the facility increments the attempt counter for each applied lexicon entry and rule, as in step 412. Also as noted above, these can be either the success and attempt counters presently in use, or a new body of counters to be substituted for the existing counters after a certain amount of parsing in the hybrid parsing mode.

VI. CONCLUSION

While this invention has been shown and described with reference to preferred embodiments, it will be understood by those skilled in the art that various changes or modifications in form and detail may be made without departing from the scope of the invention. For example, statistics may be conditioned on additional factors found to influence the success rate of a significant body of rules. For greater accuracy and resolution time in the efficient parsing mode, statistics could be stored exhaustively, without applying hashing, in a multidimensional array or other data structure. The facility is described with respect to a bottom-up parser, but is also well suited to operate in conjunction with other types of parsers, such as a top-down parser.

We claim:

1. A method in a computer system for bootstrapping statistical processing into a rule-based natural language parser to efficiently parse a principal input string using a plurality of sample input strings representative of strings to be parsed by the natural language parser, the natural language parser for producing one or more parse results from an input string comprised of words by applying rules from a set of conditioned rules that each combine words or already combined groups of words, certain subsets of the set of rules being applicable when parsing particular input strings, comprising the steps of:

for each rule, initializing a plurality of indications of the number of times that the rule has succeeded, each of the plurality of indications corresponding to a characteristic of at least one of the words or already combined groups of words that may be combined by the rule;

for each sample input string:
 exhaustively parsing the sample input string by applying each applicable rule of the set of rules to produce one or more parse results, and
 if fewer than a maximum number of parse results were produced by exhaustively parsing the sample input string, updating for each rule that combined words or already combined groups of words in the parse result an indication of the number of times that the rule succeeded that corresponds to a characteristic of at least one of the words or already combined groups of words of the sample input string combined in the parse results by the rule; and efficiently parsing the principal input string by applying applicable rules to the principal input string from the set of rules in the decreasing order of their likelihood of success as indicated by updated indications of the number of times that each rule succeeded that corresponds to a characteristic of at least one of the words or already combined groups of words of the sample input string combined in the parse results by the rule.

2. A computer-readable medium whose contents cause a computer system to bootstrap statistical processing into a rule-based natural language parser to efficiently parse a principal input string using a plurality of sample input strings representative of strings to be parsed by the natural language parser, the natural language parser for producing one or more parse results from an input string comprised of words by applying rules from a set of conditioned rules that each combined words or already combined groups of words, certain subsets of the set of rules being applicable when parsing particular input strings, by performing:

for each rule, initializing a plurality of indications of the number of times that the rule has succeeded, each of the plurality of indications corresponding to a characteristic of at least one of the words or already combined groups of words that may be combined by the rule;

for each sample input string:
exhaustively parsing the sample input string by applying each applicable rule of the set of rules to produce one or more parse results, and if a single parse result was produced by exhaustively parsing the sample input string, updating for each rule that combined words or already combined groups of words in the parse result an indication of the number of times that the rule succeeded that corresponds to a characteristic of at least one of the words or already combined groups of words of the sample input string combined in the parse results by the rule; and efficiently parsing the principal input string by applying applicable rules to the principal input string from the set of rules in the decreasing order of their likelihood of success as indicated by updated indications of the number of times that each rule succeeded that corresponds to a characteristic of at least one of the words or already combined groups of words of the sample input string combined in the parse results by the rule.

3. A method in a computer system for bootstrapping statistical processing into a rule-based natural language parser to efficiently parse a principal input string using a plurality of sample input strings representative of strings to be parsed by the natural language parser, the natural language parser for producing one or more parse results from an input string comprised of words by applying rules from a set of conditioned rules that each combine words or already combined groups of words, certain subsets of the set of rules being applicable when parsing particular input strings, comprising the steps of:

for each rule, initializing a plurality of indications of the number of times that the rule has succeeded, each of the plurality of indications corresponding to the identities of any subordinate rules that combined a group of words that the rule further combines with other words or groups of words;

for each sample input string:
exhaustively parsing the sample input string by applying each applicable rule of the set of rules to produce one or more parse results, and if fewer than a maximum number of parse results were produced by exhaustively parsing the sample input string, updating for each rule that combined words or already combined groups of words in the parse result an indication of the number of times that the rule succeeded that corresponds to the identities of any subordinate rules that combined a group of words that the rule further combines with other words or groups of words; and efficiently parsing the principal input string by applying applicable rules to the principal input string from the set of rules in the decreasing order of their likelihood of success as indicated by updated indications of the number of times that each rule succeeded that corresponds to the identities of any subordinate rules that combined a group of words that the rule further combines with other words or groups of words.

4. A computer-readable medium whose contents cause a computer system to bootstrap statistical processing into a rule-based natural language parser to efficiently parse the principal input string using a plurality of sample input strings representative of strings to be parsed by the natural language parser, the natural language parser for producing one or more parse results from an input string comprised of words by applying rules from a set of conditioned rules that each combined words or already combined groups of words, certain subsets of the set of rules being applicable when parsing particular input strings, by performing:

for each rule, initializing a plurality of indications of the number of times that the rule has succeeded, each of the plurality of indications corresponding to identities of any subordinate rules that combined a group of words that the rule further combines with other words or groups of words;

for each sample input string:
exhaustively parsing the sample input string by applying each applicable rule of the set of rules to produce one or more parse results, and if a single parse result was formed by exhaustively parsing the sample input string, updating for each rule that combined words or already combined groups of words in the parse result an indication of the number of times that the rule succeeded that corresponds to the identities of any subordinate rules that combined a group of words that the rule further combines with other words or groups of words; and efficiently parsing the principal input string by applying applicable rules to the principal input string from the set of rules in the decreasing order of their likelihood of success as indicated by updated indications of the number of times that each rule succeeded that corresponds to the identities of any subordinate rules that combined a group of words that the rule further combines with other words or groups of words.

5. A computer-implemented method system for bootstrapping statistical processing into a rule-based parser for parsing input strings of natural language text using a set of conditioned rules, the method comprising the steps of:

(a) operating the parser across a plurality of input strings to produce statistics indicating a likelihood of success of each rule of the parser; and (b) operating the parser such that the parser applies at least one of the rules of the parser in descending order of the likelihood of success indicated by the statistics produced in step (a).

6. The method of claim 5 wherein step (a) produces statistics indicating separate likelihoods of success for each rule of the parser corresponding to different conditions under which the rule may be applied by the parser, and wherein step (b) operates the parser to apply the rules of the parser in descending order of, in the case of each rule, the likelihood of success corresponding to the condition most similar to the condition in which the rule is to be applied.

7. A computer-readable medium whose contents cause a computer system to bootstrap statistical processing into a rule-based parser for parsing input strings of natural language text using a set of conditioned rules by performing:

(a) operating the parser across a plurality of input strings to produce statistics indicating a likelihood of success of each rule of the parser; and (b) operating the parser such that the parser applies at least one of the rules of the parser in descending order of the likelihood of success indicated by the statistics produced in step (a).

8. The computer-readable medium of claim 7 wherein step (a) produces statistics indicating separate likelihoods of success for each rule of the parser corresponding to different conditions under which the rule may be applied by the parser, and wherein step (b) operates the parser to apply the rules of the parser in descending order of, in the case of each rule, the likelihood of success corresponding to the condition most similar to the condition in which the rule is to be applied.

9. A computer-implemented method for efficiently parsing input strings using a parser that utilizes a set of lexicon entries and a set of rules, each lexicon entry of the set of lexicon entries and each rule of the set of rules either succeeding or failing each time it is applied, certain subsets both of the set of rules and of the set of lexicon entries being applicable when parsing particular input strings, the method comprising the steps of:

(a) applying the parser to each of a first set of input strings to generate statistics indicating a relative level of success of each lexicon entry in the set of lexicon entries and of each rule in the set of rules; and (b) applying lexicon entries in the set of lexicon entries and rules in the set of rules in the decreasing order of the relative levels of success of the rules and lexicon entries indicated by the statistics generated in step (a) to parse each of a second set of input strings.

10. The method of claim 9, further including the step of normalizing the generated statistics indicating the relative level of success of each lexicon entry against the generated statistics indicating the relative level of success of each rule, such that the statistics indicating the relative level of success of each lexicon entry are directly comparable to the statistics indicating the relative level of success of each rule.

11. A computer-readable medium whose contents cause a computer system to efficiently parse input strings using a parser that utilizes a set of lexicon entries and a set of rules, certain subsets both of the set of rules and of the set of lexicon entries being applicable when parsing particular input strings, by performing:

(a) applying the parser to each of a first set of input strings to generate statistics indicating the relative level of success of each lexicon entry in the set of lexicon entries and of each rule in the set of rules; and (b) applying lexicon entries in the set of lexicon entries and rules in the set of rules in the decreasing order of the relative levels of success of the rules and lexicon entries indicated by the statistics generated in step (a) to parse each of a second set of input strings.

12. The computer-readable medium of claim 11 wherein the contents of the computer-readable medium further cause the computer system to perform the step of normalizing the generated statistics indicating the relative level of success of each lexicon entry against the generated statistics indicating the relative level of success of each rule, such that the statistics indicating the relative level of success of each lexicon entry are directly comparable to the statistics indicating the relative level of success of each rule.

13. A computer memory storing a parsing expedition data structure for expediting the parsing of natural language input text strings by a rule-based natural language parser, the data structure comprising:

for each of a plurality of rules applicable by the parser, frequency statistics indicating the frequency with which the rule contributes to a successful parse of natural language strings when applied by the rule-based natural language parser, such that the frequency statistics stored in the data structure may be used to expedite the parsing of natural language input text strings by ordering the application of rules in accordance with the frequency statistics.

14. The computer memory of claim 13 wherein, in the data structure, the frequency statistics for each rule are subdivided into statistics indicating the frequency with which the rule contributes to a successful parse of natural language strings for natural language strings having different characteristics.

15. A computer-implemented method system for continuously enhancing a set of statistics used by a rule-based parser for parsing input strings of natural language text using a set of conditioned rules, the set of statistics indicating a likelihood of success of each rule of the parser, the method comprising the steps of:

(a) operating the parser such that the parser applies at least one of the rules of the parser in descending order of the likelihood of success indicated by the set of statistics;

(b) augmenting the set of statistics indicating the likelihood of success of each rule of the parser, based on the success of each rule when applied in step (a); and (c) operating the parser such that the parser applies at least one of the rules of the parser in descending order of the likelihood of success indicated by the augmented set of statistics.

16. A computer-readable medium whose contents cause a computer system to continuously enhance a set of statistics used by a rule-based parser for parsing input strings of natural language text using a set of conditioned rules, the set of statistics indicating likelihood of success of each rule of the parser, by performing:

(a) operating the parser such that the parser applies at least one of the rules of the parser in descending order of the likelihood of success indicated by the set of statistics;

(b) augmenting the set of statistics indicating the likelihood of success of each rule of the parser, based on the success of each rule when applied in step (a); and (c) operating the parser such that the parser applies at least one of the rules of the parser in descending order of the likelihood of success indicated by the augmented set of statistics.

* * * * *

UNITED STATES PATENT AND TRADEMARK OFFICE
CERTIFICATE OF CORRECTION

PATENT NO. : 5,963,894
DATED : October 5, 1999
INVENTOR(S) : Stephen D. Richardson et al It is certified that error appears in the above-indentified patent and that said Letters Patent is hereby corrected as shown below:

Column 16, line 27, claim 4, delete "the".

Column 18, line 33, claim 15, delete "system"

Signed and Sealed this

Thirteenth Day of March, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 5,963,894  
DATED : October 5, 1999  
INVENTOR(S) : Richardson et al.

Page 1 of 1

It is certified that error appears in the above-identified patent and that said Letters Patent is hereby corrected as shown below:

Column 6,  
Line 57, "ruled" should be -- rules --.

Column 12,  
Line 26, "in" should be -- is --.

Column 16, claim 5,  
Line 61, delete "system".

Signed and Sealed this

First Day of January, 2002

Attest:

Attesting Officer

JAMES E. ROGAN  
Director of the United States Patent and Trademark Office